(12) United States Patent
Hino

(10) Patent No.: US 8,894,218 B2
(45) Date of Patent: Nov. 25, 2014

(54) PROJECTOR WITH A PLURALITY OF DRIVE POWER MODES

(75) Inventor: Shunsuke Hino, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 223 days.

(21) Appl. No.: 13/353,907

(22) Filed: Jan. 19, 2012

(65) Prior Publication Data

US 2012/0206698 A1 Aug. 16, 2012

(30) Foreign Application Priority Data

Feb. 15, 2011 (JP) .................................. 2011-029491
Feb. 18, 2011 (JP) .................................. 2011-032932

(51) Int. Cl.
*G03B 21/20* (2006.01)
*H05B 41/288* (2006.01)

(52) U.S. Cl.
CPC ........... *H05B 41/2887* (2013.01); *Y02B 20/202* (2013.01); *G03B 21/2053* (2013.01); *G03B 21/2026* (2013.01)
USPC .......................................................... 353/85

(58) Field of Classification Search
USPC ..................................................... 353/85, 94
See application file for complete search history.

(56) References Cited

U.S. PATENT DOCUMENTS

| 6,224,217 | B1 * | 5/2001 | Tanaka ............................ 353/94 |
| 2003/0146919 | A1 | 8/2003 | Kawashima et al. |
| 2009/0213336 | A1 | 8/2009 | Takezawa |
| 2009/0244496 | A1 | 10/2009 | Sugino et al. |
| 2010/0128232 | A1 * | 5/2010 | Kagata et al. .................. 353/85 |
| 2011/0063584 | A1 | 3/2011 | Hirao et al. |
| 2013/0271024 | A1 | 10/2013 | Yamada et al. |

FOREIGN PATENT DOCUMENTS

| CN | 102026454 A | 4/2011 |
| JP | B2-3495362 | 2/2004 |
| JP | A-2005-235445 | 9/2005 |
| JP | A-2007-25054 | 2/2007 |
| JP | B2-4089627 | 5/2008 |
| JP | A-2009-198940 | 9/2009 |
| JP | A-2010-113822 | 5/2010 |
| JP | A-2012-134032 | 7/2012 |
| WO | WO 2006/132167 A1 | 12/2006 |

* cited by examiner

*Primary Examiner* — Thanh Luu
*Assistant Examiner* — Renee D Chavez
(74) *Attorney, Agent, or Firm* — Oliff PLC

(57) ABSTRACT

A projector comprising: a discharge lamp; a discharge lamp drive unit that drives the discharge lamp by supplying drive power to the discharge lamp; and a control unit that has a first mode and a second mode as operation modes and controls the discharge lamp drive unit according to the operation modes, wherein the control unit controls the discharge lamp drive unit to supply first power as the drive power to the discharge lamp when the operation mode is the first mode, and controls the discharge lamp drive unit to supply the drive power to the discharge lamp while changing the drive power in a range equal to or less than second power smaller than the first power and equal to or more than third power smaller than the second power when the operation mode is the second mode.

20 Claims, 17 Drawing Sheets

PROJECTOR WITH A PLURALITY OF DRIVE POWER MODES

The entire disclosure of Japanese Patent Application No. 2011-029491 filed on Feb. 15, 2011 and Japanese Patent Application No. 2011-032932 filed on Feb. 18, 2011 are expressly incorporated by reference herein.

BACKGROUND

1. Technical Field

The present invention relates to a projector.

2. Related Art

Projectors using discharge lamps such as high-pressure mercury lamps and metal halide lamps have been put into practical use. Some of the projectors having an operation mode (standby mode) of darkening projected images while maintaining the lighting states of the discharge lamps when no image signal is input or when a specific operation is performed by a user have been developed. As the projector, for example, JP-A-2007-025054 discloses a projector including means for controlling power supplied to a discharge lamp to the minimum value when no image signal is input or the like in order to suppress power consumption.

However, if the power supplied to the discharge lamp is continuously set lower for driving while the lighting state of the discharge lamp is maintained, the electrode temperature of the discharge lamp becomes lower and a blackening phenomenon that the electrode material (tungsten or the like) precipitates on the envelope of the discharge lamp becomes easier to occur. When the blackening phenomenon occurs, the blackened part absorbs light and the temperature of the discharge lamp rises, the glass used for the envelope or the like is crystallized, and devitrification phenomenon is caused. When the devitrification phenomenon occurs, the illuminance of the discharge lamp becomes lower and the envelope becomes easier to break. Therefore, it is important not to cause the blackening phenomenon for the longer life of the discharge lamp.

SUMMARY

An advantage of some aspects of the invention is to provide a projector in which deterioration of a discharge lamp may be suppressed with suppressed power consumption.

A projector according to a first aspect of the invention includes a discharge lamp, a discharge lamp drive unit that drives the discharge lamp by supplying drive power to the discharge lamp, and a control unit that has a first mode and a second mode as operation modes and controls the discharge lamp drive unit according to the operation modes, wherein the control unit controls the discharge lamp drive unit to supply first power as the drive power to the discharge lamp when the operation mode is the first mode, and controls the discharge lamp drive unit to supply the drive power to the discharge lamp while changing the drive power in a range equal to or less than second power smaller than the first power and equal to or more than third power smaller than the second power when the operation mode is the second mode.

According to the aspect, since the second mode with the lower power is provided, power consumption may be suppressed. Further, according to the embodiment, in the second mode with the lower power, the discharge lamp drive unit is controlled to supply the drive power to the discharge lamp while changing the power, and thus, the state with the lower electrode temperature of the discharge lamp may not be maintained in a long time. Thereby, occurrence of the blackening phenomenon of the discharge lamp may be suppressed. Therefore, the projector in which deterioration of the discharge lamp may be suppressed with suppressed power consumption may be realized. In addition, since the drive power is changed in the second mode with the lower power, even when the illuminance of the discharge lamp changes due to the change of the drive power, a user hardly has a feeling of discomfort.

In the projector, the discharge lamp drive unit may supply the drive power to the discharge lamp by supplying an alternating current as a drive current to the discharge lamp, and the control unit may control the discharge lamp drive unit to supply the drive power to the discharge lamp while changing the drive power to change an average value of the drive power per cycle of the drive current when the operation mode is the second mode.

Thereby, the electrode temperature of the discharge lamp may be reliably raised and the state with the lower electrode temperature of the discharge lamp is not maintained in a long time. Therefore, occurrence of the blackening phenomenon of the discharge lamp may be suppressed.

In the projector, the third power may be power with which the discharge lamp may maintain a lighting state.

Thereby, the discharge lamp may maintain the lighting state both in the first mode and the second mode. Therefore, it is not necessary to relight the discharge lamp when the operation mode is changed from the second mode to the first mode, and the operation mode may be changed in a short time.

A projector according to a second aspect of the invention includes plural light sources, and a control unit that has a first mode and a second mode as operation modes and controls the light sources according to the operation modes, each of the light sources includes a discharge lamp and a discharge lamp drive unit that drives the discharge lamp by supplying drive power to the discharge lamp, wherein the control unit controls the respective discharge lamp drive units to supply first power as the drive power to the respective discharge lamps when the operation mode is the first mode, and controls the respective discharge lamp drive units to supply the drive power to the respective discharge lamps while changing the drive power supplied to the respective discharge lamps in a range equal to or less than second power smaller than the first power and equal to or more than third power smaller than the second power so that change widths of total values of the drive power supplied to the respective discharge lamps may be less than twice a difference between the second power and the third power when the operation mode is the second mode.

According to the aspect, since the second mode with the lower power is provided, power consumption may be suppressed. Further, according to the embodiment, in the second mode with the lower power, the discharge lamp drive unit is controlled to supply the drive power to the discharge lamp while changing the power, and thus, the state with the lower electrode temperature of the discharge lamp is not maintained in a long time. Thereby, occurrence of the blackening phenomenon of the discharge lamp may be suppressed. Therefore, the projector in which deterioration of the discharge lamp may be suppressed with suppressed power consumption may be realized. In addition, the change width of the total value of the drive power supplied to the respective discharge lamps may be less than a value twice the difference between the second power and the third power, and thus, the change of the illuminance of the projector due to the change of the drive power is smaller compared to the case where there is one discharge lamp. Therefore, the projector that hardly brings a feeling of discomfort to a user may be realized.

In the projector, the respective discharge lamp drive units may supply the drive power to the discharge lamps by supplying alternating currents as drive currents to the discharge lamps, and the control unit may control the discharge lamp drive units to supply the drive power to the respective discharge lamps while changing the drive power to change average values of the drive power per cycle of the drive currents when the operation mode is the second mode.

Thereby, the electrode temperatures of the discharge lamps may be reliably raised and the states with the lower electrode temperatures of the discharge lamps are not maintained in a long time. Therefore, occurrence of the blackening phenomenon of the discharge lamps may be suppressed.

In the projector, the third power maybe power with which the respective discharge lamps may maintain lighting states.

Thereby, the discharge lamps may maintain the lighting state both in the first mode and the second mode. Therefore, it is not necessary to relight the discharge lamps when the operation mode is changed from the second mode to the first mode, and the operation mode may be changed in a short time.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be explained in detail with reference to the drawings. Note that the embodiments explained as below do not unduly limit the subject matter of the invention described in the appended claims. Further, all of the configurations explained as below are not necessarily essential component elements of the invention.

Figure 1:
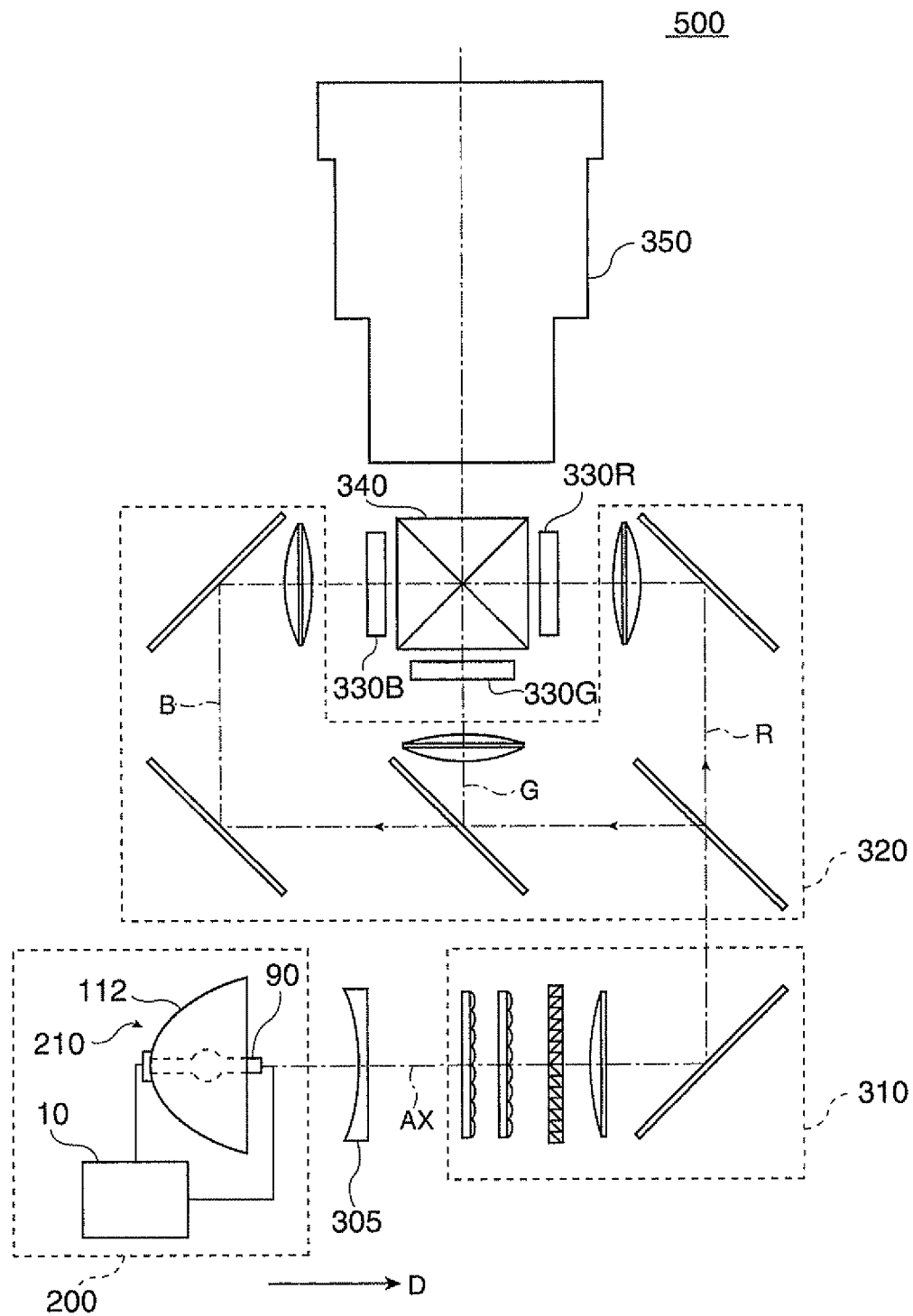
FIG. 1 is an explanatory diagram showing an optical system of a projector 500 according to the first embodiment.

1. Projector according to First Embodiment
1-1. Optical System of Projector according to First Embodiment FIG. 1 is an explanatory diagram showing an optical system of a projector 500 according to the first embodiment of the invention. The projector 500 includes a light source 200, a parallelizing lens 305, an illumination system 310, a color separation system 320, three liquid crystal light valves 330R, 330G, 330B, and a cross dichroic prism 340, and a projection system 350.

The light source 200 includes a discharge lamp 90, and a discharge lamp drive unit 230 that drives the discharge lamp 90 by supplying drive power to the discharge lamp 90, which will be described later. In the example shown in FIG. 1, the light source 200 has a light source unit 210 including the discharge lamp 90, and a discharge lamp lighting device 10 including the discharge lamp drive unit 230 that drives the discharge lamp 90 by supplying drive power to the discharge lamp 90, which will be described later.

The light source 200 has the light source unit 210 and the discharge lamp lighting device 10. The light source unit 210 has a main reflector 112, a sub-reflector 50, which will be described later, and the discharge lamp 90. The discharge lamp lighting device 10 supplies power to the discharge lamp 90 and lights the discharge lamp 90. The main reflector 112 reflects the light emitted from the discharge lamp 90 in an irradiation direction D. The irradiation direction D is in parallel to an optical axis AX. The light from the light source unit 210 passes through the parallelizing lens 305 and enters the illumination system 310. The parallelizing lens 305 parallelizes the light from the light source unit 210.

The illumination system 310 uniformizes the illuminance of the light from the light source 200 in the liquid crystal light valves 330R, 330G, 330B. Further, the illumination system 310 aligns the polarization direction of the light from the light source 200 in one direction. This is for effective use of the light from the light source 200 in the liquid crystal light valves 330R, 330G, 330B. The light having the adjusted illuminance distribution and polarization direction enters the color separation system 320. The color separation system 320 separates the incident light into three color lights of red (R), green (G), and blue (B). The three color lights are respectively modulated by the liquid crystal light valves 330R, 330G, 330B corresponding to the respective colors. The liquid crystal light valves 330R, 330G, 330B include liquid crystal panels 560R, 560G, 560B, which will be described later, and polarizers (not shown) provided at the light-incident sides and the light-exiting sides of the respective liquid crystal panels 560R, 560G, 560B. The modulated three color lights are combined by the cross dichroic prism 340. The combined light enters the projection system 350. The projection system 350 projects the incident light on a screen (not shown). Thereby, an image is displayed on the screen.

Note that known various configurations may be employed for the respective configurations of the parallelizing lens 305, the illumination system 310, the color separation system 320, the cross dichroic prism 340, and the projection system 350.

Figure 2:
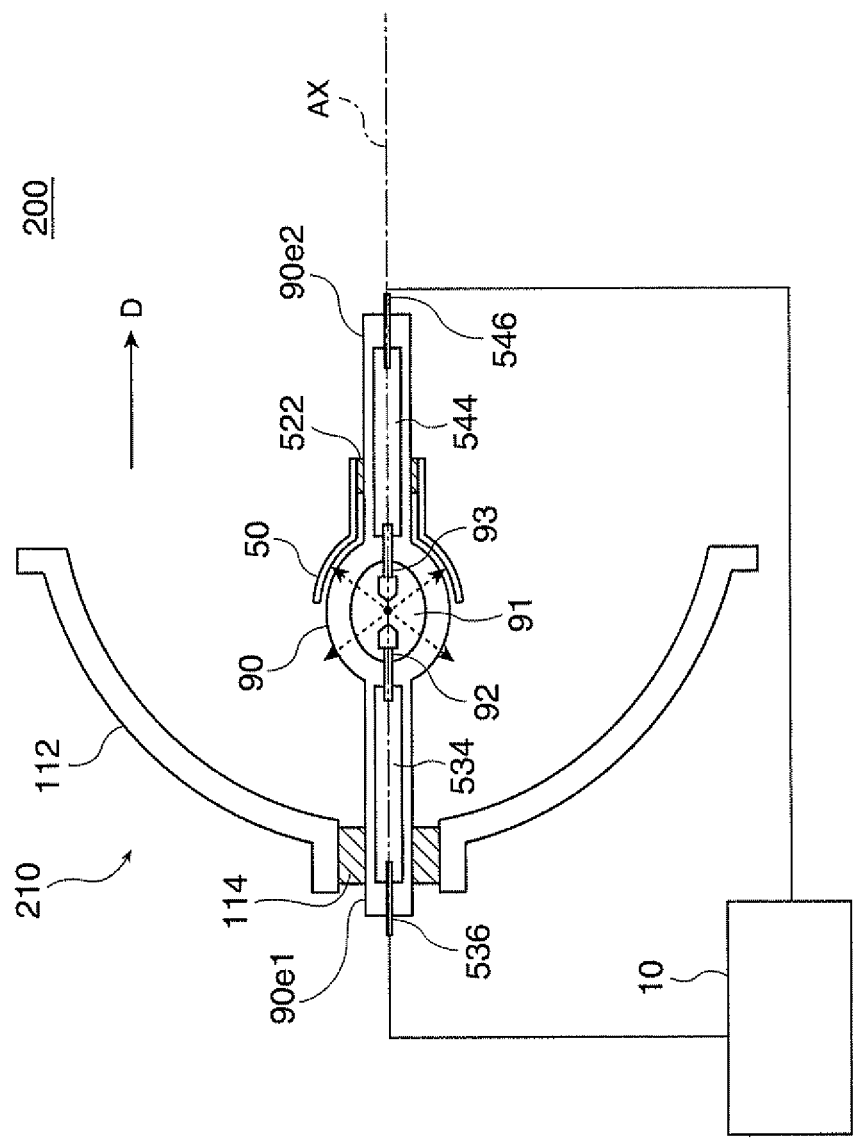
FIG. 2 is an explanatory diagram showing a configuration of a light source 200.

FIG. 2 is an explanatory diagram showing a configuration of the light source 200. The light source 200 has the light source unit 210 and the discharge lamp lighting device 10. In the drawing, a sectional view of the light source unit 210 is shown. The light source unit 210 has the main reflector 112, the discharge lamp 90, and the sub-reflector 50.

The shape of the discharge lamp 90 is a rod shape extending from a first end 90e1 to a second end 90e2 in the irradiation direction D. The material of the discharge lamp 90 is a light-transmissive material such as quartz glass, for example. The center part of the discharge lamp 90 spherically bulges and a discharge space 91 is formed therein. In the discharge space 91, a gas as a discharge medium containing mercury, a rare gas, a metallic halide compound, etc. is sealed.

The discharge lamp 90 includes a first electrode 92 and a second electrode 93. In the example shown in FIG. 2, the first electrode 92 and the second electrode 93 are provided to project into the discharge space 91. The first electrode 92 is provided at the first end 90e1 side of the discharge space 91 and the second electrode 93 is provided at the second end 90e2 side of the discharge space 91. The shapes of the first electrode 92 and the second electrode 93 are rod shapes extending along the optical axis AX. In the discharge space 91, electrode ends (also referred to as "discharge ends") of the first electrode 92 and the second electrode 93 are opposed to each other at a predetermined distance. Note that the material of the first electrode 92 and the second electrode 93 is a metal such as tungsten, for example.

A first terminal 536 is provided on the first end 90e1 of the discharge lamp 90. The first terminal 536 and the first electrode 92 are electrically connected by a conducting member 534 through the discharge lamp 90. Similarly, a second terminal 546 is provided on the second end 90e2 of the discharge lamp 90. The second terminal 546 and the second electrode 93 are electrically connected by a conducting member 544 through the discharge lamp 90. The material of the first terminal 536 and the second terminal 546 is a metal such as tungsten, for example. Further, as the respective conducting members 534, 544, for example, molybdenum foils are used.

The first terminal 536 and the second terminal 546 are connected to the discharge lamp lighting device 10. The discharge lamp lighting device 10 supplies drive currents I for driving the discharge lamp 90 to the first terminal 536 and the second terminal 546. As a result, arc discharge occurs between the first electrode 92 and the second terminal electrode 93. The light generated by the arc discharge (discharge light) is radiated from the discharge location in all directions as shown by arrows of dashed lines.

To the first end 90e1 of the discharge lamp 90, the main reflector 112 is fixed by a fixing member 114. The shape of the reflection surface (the surface at the discharge lamp 90 side) of the main reflector 112 is a spheroidal shape. The main reflector 112 reflects the discharge light toward the irradiation direction D. Note that, as the shape of the reflection surface of the main reflector 112, not limited to the spheroidal shape but also various shapes that reflect the discharge light toward the irradiation direction D may be employed. For example, a paraboloidal shape may be employed. In this case, the main reflector 112 may convert the discharge light into light nearly in parallel to the optical axis AX. Therefore, the parallelizing lens 305 may be omitted.

To the second end 90e2 side of the discharge lamp 90, the sub-reflector 50 is fixed by a fixing member 522. The shape of the reflection surface (the surface at the discharge lamp 90 side) of the sub-reflector 50 is a spherical shape surrounding the second end 90e2 side of the discharge space 91. The sub-reflector 50 reflects the discharge light toward the main reflector 112. Thereby, the use efficiency of the light radiated from the discharge space 91 may be improved.

Note that, as the material of the fixing members 114, 522, any heat-resistant material having resistance to heat generation of the discharge lamp 90 (for example, an inorganic adhesive) maybe employed. Further, as a method of fixing the arrangement of the main reflector 112 and the sub-reflector 50 to the discharge lamp 90, not limited to the method of fixing the main reflector 112 and the sub-reflector 50 with respect to the discharge lamp 90, but any method may be employed. For example, the discharge lamp 90 and the main reflector 112 may be independently fixed to a casing (not shown) of the projector 500. This is applicable to the sub-reflector 50.

1-2. Circuit Configuration of Projector according to First Embodiment

Figure 3:
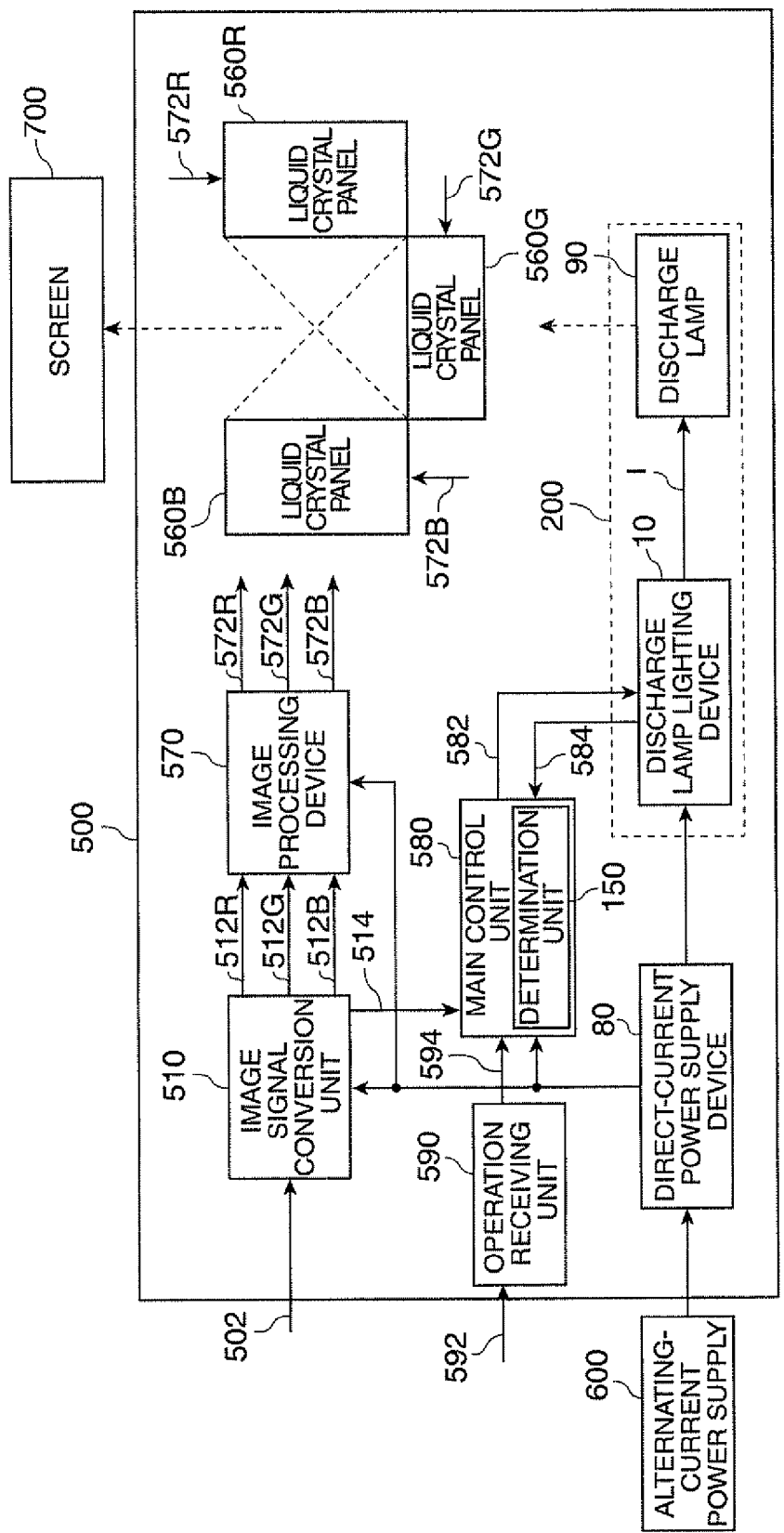
FIG. 3 shows an example of a circuit configuration of the projector 500 according to the first embodiment.

FIG. 3 shows an example of a circuit configuration of the projector 500 according to the first embodiment. The projector 500 may include an image signal conversion unit 510, a direct-current power supply device 80, the discharge lamp lighting device 10, the discharge lamp 90, the liquid crystal panels 560R, 560G, 560B, an image processing device 570, a main control unit 580, and an operation receiving unit 590 in addition to the optical system explained as above.

The image signal conversion unit 510 generates image signals 512R, 512G, 512B by converting an externally input image signal 502 (brightness-color-difference signal, analog RGB signal, or the like) into a digital RGB signal having a predetermined word length, and supplies them to the image processing device 570. Further, the image signal conversion unit 510 may output information on presence or absence of wiring for inputting the image signal 502 and information on presence or absence of the image signal 502 to the main control unit 580 via a communication signal 514.

The image processing device 570 respectively performs image processing on the three image signals 512R, 512G, 512B, and supplies drive signals 572R, 572G, 572B for driving the liquid crystal panels 560R, 560G, 560B, respectively, to the liquid crystal panels 560R, 560G, 560B. On the basis of the drive signals 572R, 572G, 572B input to the liquid crystal panels 560R, 560G, 560B, images are projected on a screen 700 by the optical system that has been explained using FIG. 1.

The direct-current power supply device 80 converts an alternating-current voltage supplied from an external alternating-current power supply 600 into a constant direct-current voltage, and supplies the direct-current voltage to the image signal conversion unit 510, the image processing device 570 located at the secondary side of a transformer (not shown, but included in the direct-current power supply device 80) and the discharge lamp lighting device 10 located at the primary side of the transformer.

The discharge lamp lighting device 10 forms a discharge path by generating a high voltage between the electrodes of the discharge lamp 90 at startup to cause dielectric breakdown, and subsequently, supplies the drive current I for the discharge lamp 90 to maintain discharge.

The liquid crystal panels 560R, 560G, 560B modulate brightness of color lights entering the respective liquid crystal panels via the optical system explained as above based on the drive signals 572R, 572G, 572B, respectively.

The operation receiving unit 590 receives an operation 592 for the projector 500 and outputs information on the operation 592 to the main control unit 580 via a communication signal 594. The operation receiving unit 590 may include various known configurations such as a button, a lever, and a switch.

The main control unit 580 controls the operation from starting of turning on to turning off of the projector 500. For example, a turn-on command and a turn-off command may be output to the discharge lamp lighting device 10 via a communication signal 582. Further, the main control unit 580 may receive lighting information representing the lighting state of the discharge lamp 90 from the discharge lamp lighting device 10 via a communication signal 584. Furthermore, the unit may receive information on the operation 592 received by the operation receiving unit 590 via the communication signal 594.

In addition, the main control unit 580 may function as a determination unit 150 that determines whether the operation mode of the projector 500 is a first mode or a second mode. Regarding the operation modes, for example, the first mode is set to a normal mode in which the projector 500 projects an image and the second mode is set to a standby mode in which the projector 500 takes a standby state in which the projected image is significantly made darker than in the normal mode (or no image is projected). Note that, as the operation modes, a third mode different from the first mode or the second mode may be provided. For example, the third mode may be set to an energy-saving mode in which the discharge lamp 90 is driven with power of about 80% of that in the normal mode.

The determination unit 150 may set the operation mode to the second mode if wiring for inputting the image signal 502 or the like is not connected to the projector 500 or the image signal 502 is not input based on the communication signal 514, set the operation mode to the second mode if the operation receiving unit 590 receives a mute operation of turning the state of the projector 500 to the standby state in which the projected image is made darker than in the normal mode (or no image is projected) as the operation 592 based on the communication signal 584, or set the operation mode to the first mode in other cases.

The determination unit 150 may output operation mode information as information on the determined operation mode to the discharge lamp lighting device 10 via the communication signal 582.

Figure 4:
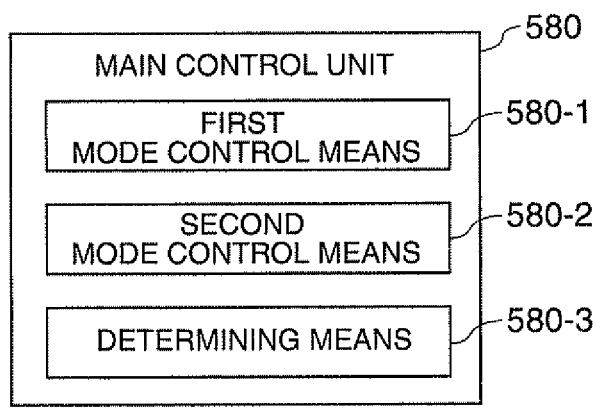
FIG. 4 is a diagram for explanation of a configuration example of a main control unit 580.

Note that the main control unit 580 may be realized by a dedicated circuit to perform the above described control and various kinds of control of processing, which will be described later, however, for example, a CPU (Central Processing Unit) may function as a computer by executing control programs stored in a storage medium or the like (not shown) and perform various kinds of control of the processing. FIG. 4 is a diagram for explanation of a configuration example of the main control unit 580. As shown in FIG. 4, the main control unit 580 may be adapted to function as a first mode control unit 580-1 configured to control the light source 200 in the first mode, a second mode control unit 580-2 configured to control the light source 200 in the second mode, and a determining unit 580-3 serving as the determination unit 150 according to the control programs.

1-3. Configuration of Discharge Lamp Lighting Device in First Embodiment

Figure 5:
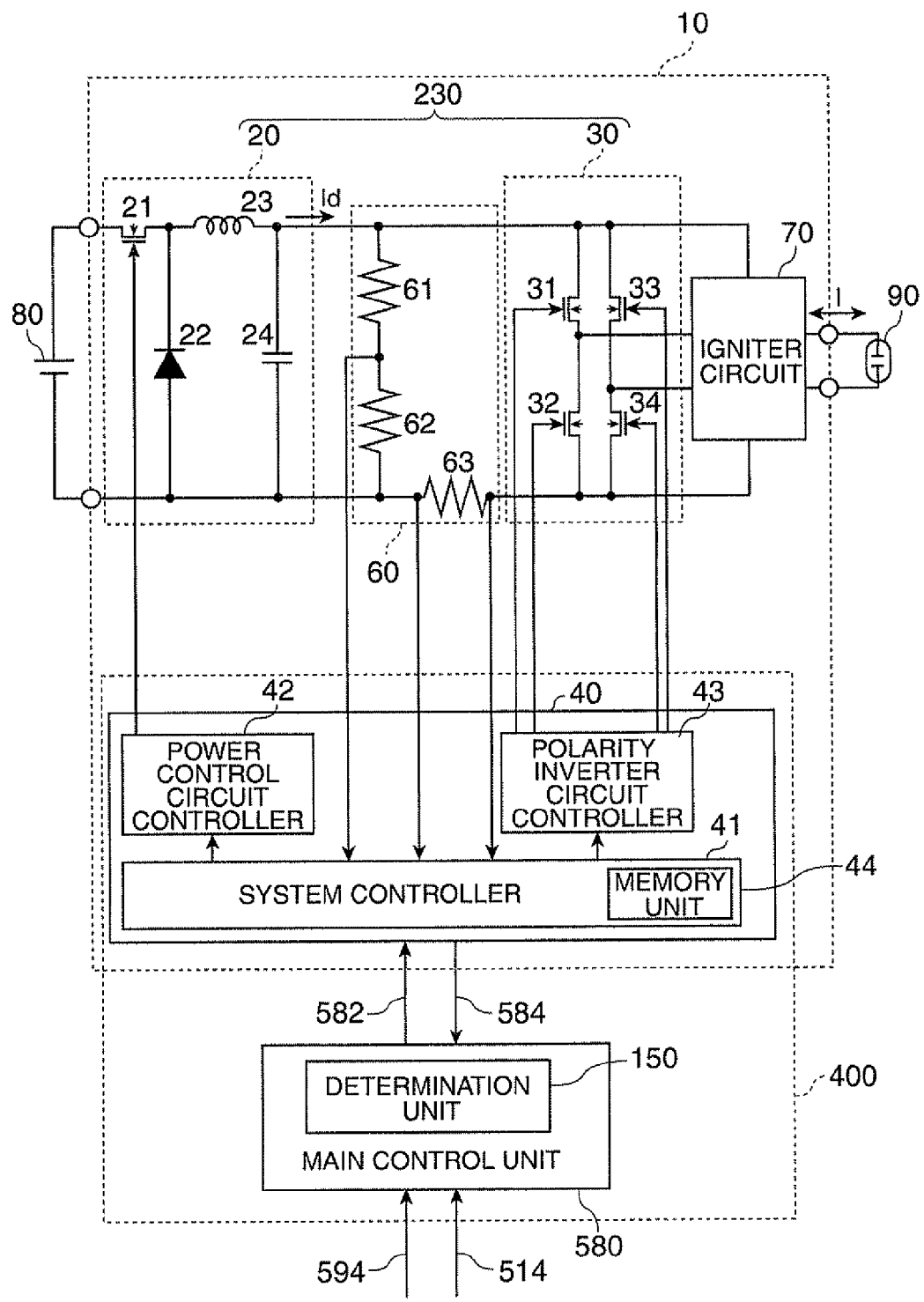
FIG. 5 shows an example of a circuit configuration of a discharge lamp lighting device 10.

FIG. 5 shows an example of a circuit configuration of the discharge lamp lighting device 10.

The discharge lamp lighting device 10 includes a power control circuit 20. The power control circuit 20 generates drive power to be supplied to the discharge lamp 90. In the first embodiment, the power control circuit 20 includes a down-chopper circuit using the direct-current power supply device 80 as input, dropping the input voltage, and outputting a direct current Id.

The power control circuit 20 may include a switch element 21, a diode 22, a coil 23, and a capacitor 24. The switch element 21 may include a transistor, for example. In the first embodiment, one end of the switch element 21 is connected to the positive voltage side of the direct-current power supply device 80 and the other end is connected to the cathode terminal of the diode 22 and one end of the coil 23. Further, one end of the capacitor 24 is connected to the other end of the coil 23 and the other end of the capacitor 24 is connected to the anode terminal of the diode 22 and the negative voltage side of the direct-current power supply device 80. A power control signal is input from a light source control unit 40, which will be described later, to the control terminal of the switch element 21, and ON/OFF of the switch element 21 is controlled. For the power control signal, for example, a PWM (Pulse Width Modulation) control signal may be used.

Here, when the switch element 21 turns on, a current flows in the coil 23, and energy is accumulated in the coil 23. Then, when the switch element 21 turns off, the energy accumulated in the coil 23 is emitted in the path passing through the capacitor 24 and the diode 22. As a result, the direct current Id is generated in response to the ratio of the time in which the switch element 21 turns on.

The discharge lamp lighting device 10 includes a polarity inverter circuit 30. The polarity inverter circuit 30 inputs the direct current Id output from the power control circuit 20 and inverts polarity with given timing, and thereby, generates and outputs the drive current I as a direct current that continues in a controlled time or an alternating current having an arbitrary frequency. In the first embodiment, the polarity inverter circuit 30 includes an inverter bridge circuit (full-bridge circuit).

The polarity inverter circuit 30 includes a first switch element 31, a second switch element 32, a third switch element 33, and a fourth switch element 34 or transistors or the like, for example, and the series-connected first switch element 31 and second switch element 32 and the series-connected third switch element 33 and fourth switch element 34 are connected in parallel to each other. To the control terminals of the first switch element 31, the second switch element 32, the third switch element 33, and the fourth switch element 34, polarity inversion control signals are respectively input from the light source control unit 40, and ON/OFF of the first switch element 31, the second switch element 32, the third switch element 33, and the fourth switch element 34 is controlled based on the polarity inversion control signals.

The polarity inverter circuit 30 alternately repeats ON/OFF of the first switch element 31 and the fourth switch element 34, and the second switch element 32 and the third switch element 33, and thereby, alternately inverts the polarity of the direct current Id output from the power control circuit 20 and generates and outputs the drive current I as a direct current that continues in a controlled time or an alternating current having a controlled frequency from the common connection point between the first switch element 31 and the second switch element 32 and the common connection point between the third switch element 33 and the fourth switch element 34.

That is, when the first switch element 31 and the fourth switch element 34 are on, the second switch element 32 and the third switch element 33 are turned off, and, when the first switch element 31 and the fourth switch element 34 are off, the second switch element 32 and the third switch element 33 are turned on. Therefore, when the first switch element 31 and the fourth switch element 34 are on, the drive current I flowing from the one end of the capacitor 24 sequentially in the first switch element 31, the discharge lamp 90, and the fourth switch element 34 is generated. Further, when second switch element 32 and the third switch element 33 are on, the drive current I flowing from the one end of the capacitor 24 sequentially in the third switch element 33, the discharge lamp 90, and the second switch element 32 is generated.

In the first embodiment, the power control circuit 20 and the polarity inverter circuit 30 collectively correspond to the discharge lamp drive unit 230. That is, the discharge lamp drive unit 230 supplies the drive current I to the discharge lamp 90, and thereby, supplies the drive power to the discharge lamp 90 to drive the discharge lamp 90.

The discharge lamp lighting device 10 includes the light source control unit 40. The light source control unit 40 has the first mode and the second mode as operation modes and controls the discharge lamp drive unit 230 according to the operation mode. In the example shown in FIG. 5, the light source control unit 40 receives operation mode information as information on the operation node determined by the determination unit 150 formed as a part of the main control unit 580 via the communication signal 582, and controls the discharge lamp drive unit 230 based on the received operation mode information.

Further, in the example shown in FIG. 5, the light source control unit 40 controls the power control circuit 20 and the polarity inverter circuit 30, and thereby, controls the drive power to be supplied to the discharge lamp 90, the retention time in which the drive current I continues with the same polarity, the current value and the frequency of the drive current I, etc. The light source control unit 40 performs polarity inversion control of controlling the retention time in which the drive current I continues with the same polarity, the frequency of the drive current I, etc. using polarity inversion timing of the drive current I on the polarity inverter circuit 30. Further, the light source control unit 40 performs drive power control of controlling the drive power to be supplied to the discharge lamp 90 on the power control circuit 20 by controlling the current value of the output direct current Id.

The configuration of the light source control unit 40 is not particularly limited, and, in the first embodiment, the light source control unit 40 includes a system controller 41, a power control circuit controller 42, and a polarity inverter circuit controller 43. Note that part or the entire of the light source control unit 40 may be formed by a semiconductor integrated circuit.

The system controller 41 controls the power control circuit controller 42 and the polarity inverter circuit controller 43, and thereby, controls the power control circuit 20 and the polarity inverter circuit 30. The system controller 41 may control the power control circuit controller 42 and the polarity inverter circuit controller 43 based on a drive voltage V1a detected by a voltage detection part of a state detection unit 60 provided within the discharge lamp lighting device 10, which will be described later, and the drive current I.

In the first embodiment, the system controller 41 includes a memory unit 44. Note that the memory unit 44 may be provided independently of the system controller 41.

The system controller 41 may control the power control circuit 20 and the polarity inverter circuit 30 based on information stored in the memory unit 44. In the memory unit 44, for example, information on drive parameters such as the retention time in which the drive current I continues with the same polarity, the current value, the frequency, the waveform, the modulation pattern of the drive current I, etc. may be stored.

The power control circuit controller 42 controls the power control circuit 20 by outputting a power control signal to the power control circuit 20 based on a control signal from the system controller 41.

The polarity inverter circuit controller 43 controls the polarity inverter circuit 30 by outputting a polarity inversion control signal to the polarity inverter circuit 30 based on a control signal from the system controller 41.

Figure 6:
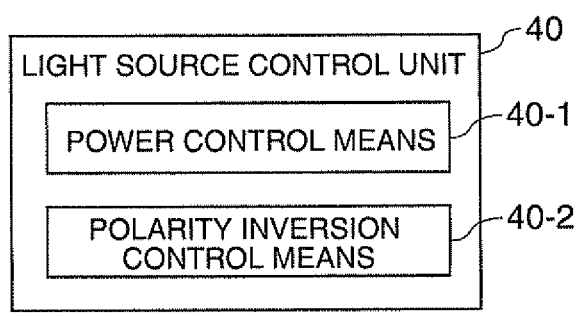
FIG. 6 is a diagram for explanation of another configuration example of a light source control unit 40.

Note that the light source control unit 40 may be realized by a dedicated circuit to perform the above described control and various kinds of control of processing, which will be described later, however, for example, a CPU (Central Processing Unit) may function as a computer by executing control programs stored in the storage unit 44 or the like and perform various kinds of control of the processing. FIG. 6 is a diagram for explanation of another configuration example of the light source control unit 40. As shown in FIG. 6, the light source control unit 40 may be adapted to function as a power control unit 40-1 configured to control the power control circuit 20 and a polarity inversion control unit 40-2 configured to control the polarity inverter circuit 30 according to control programs.

Note that, in the example shown in FIG. 5, the light source control unit 40 and the main control unit 580 collectively correspond to the control unit 400. Note that part or the entire of the function of the control unit 400 may be performed by the light source control unit 40 or performed by the main control unit 580.

The discharge lamp lighting device 10 may include the state detection unit 60 that detects the state of the discharge lamp 90. The state detection unit 60 may include the voltage detection part that detects the drive voltage V1a of the discharge lamp 90 and outputs drive voltage information and a current detection part that detects the drive current I and outputs drive current information, for example. In the first embodiment, the voltage detection part includes first and second resistors 61, 62 and the current detection part includes a third resistor 63.

In the first embodiment, the voltage detection part detects the drive voltage V1a from voltages divided by the first resistor 61 and the second resistor 62 connected in parallel to the discharge lamp 90 and series-connected to each other. Further, in the first embodiment, the current detection part detects the drive current I from a voltage generated in the third resistor 63 series-connected to the discharge lamp 90.

The discharge lamp lighting device 10 may include an igniter circuit 70. The igniter circuit 70 operates only when the discharge lamp 90 starts to light and supplies a high voltage (a voltage higher than that at normal lighting of the discharge lamp 90) necessary for dielectric breakdown between the electrodes (between the first electrode 92 and the second electrode 93) of the discharge lamp 90 and formation of a discharge path between the electrodes (between the first electrode 92 and the second electrode 93) of the discharge lamp 90. In the first embodiment, the igniter circuit 70 is connected in parallel to the discharge lamp 90.

1-4. Relationship between Polarity of Drive Current and Electrode Temperature

Figures 7A, 7B:
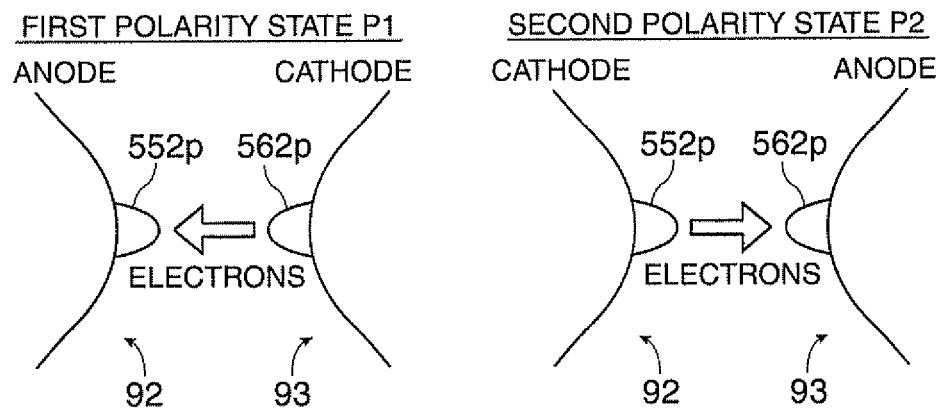
FIGS. 7A to 7C are explanatory diagrams showing a relationship between polarity of a drive current I supplied to a discharge lamp 90 and an electrode temperature.
Figure 7C:
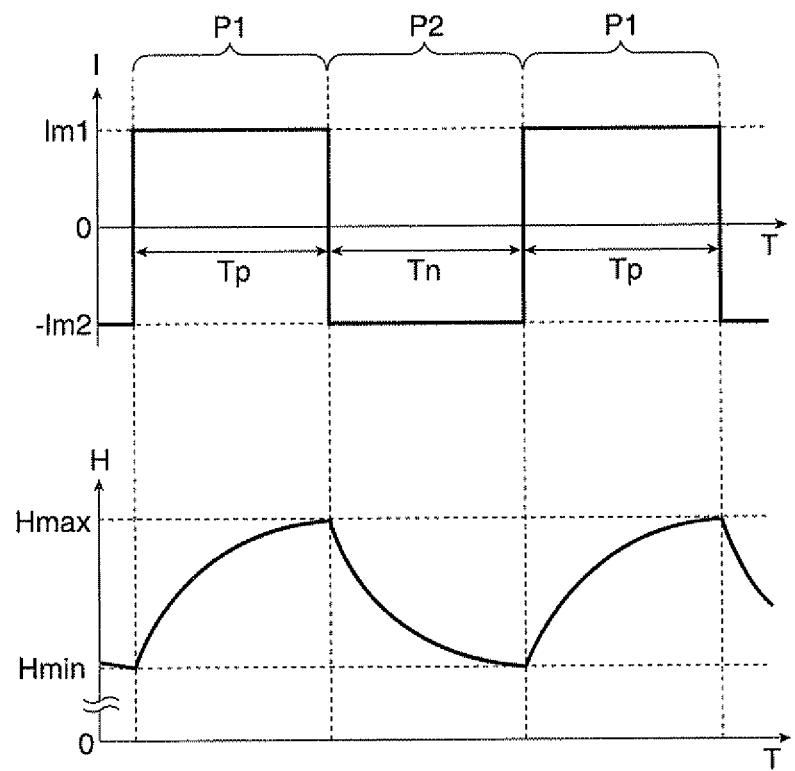

FIGS. 7A to 7C are explanatory diagrams showing a relationship between polarity of the drive current I supplied to the discharge lamp 90 and an electrode temperature. FIGS. 7A and 7B show operation states of the first electrode 92 and the second electrode 93. In the drawings, ends of the first electrode 92 and the second electrode 93 are shown. Projections 552$p$ and 562$p$ are provided on the ends of the first electrode 92 and the second electrode 93, respectively. The discharge generated between the first electrode 92 and the second electrode 93 is mainly generated between the projection 552p and the projection 562p. In the example shown in FIGS. 7A and 7B, compared to the case without projections, the shift of the discharge location (arc location) in the first electrode 92 and the second electrode 93 may be suppressed. However, these projections may be omitted.

FIG. 7A shows a first polarity state P1 in which the first electrode 92 operates as an anode and the second electrode 93 operates as a cathode. In the first polarity state P1, electrons move from the second electrode 93 (cathode) to the first electrode 92 (anode) due to discharge. Electrons are emitted from the cathode (second electrode 93). The electrons emitted from the cathode (second electrode 93) collide with the end of the anode (first electrode 92). Heat is generated due to the collision and the temperature of the end (projection 552p) of the anode (first electrode 92) rises.

FIG. 7B shows a second polarity state P2 in which the first electrode 92 operates as a cathode and the second electrode 93 operates as an anode. In the second polarity state P2, electrons move from the first electrode 92 to the second electrode 93 oppositely to the first polarity state P1. As a result, the temperature of the end (projection 562p) of the second electrode 93 rises.

As described above, the temperature of the anode is likely to be higher than that of the cathode. Here, the condition that the temperature of one electrode is continuously higher than that of the other electrode may cause various defects. For example, if the end of the high-temperature electrode excessively melts, unintended electrode deformation may be caused. As a result, the arc length may be deviated from an appropriate value. Further, if the melting of the end of the low-temperature electrode is insufficient, minute concavities and convexities produced on the end may be left unmelted. As a result, the so-called arc jump (unstable shift of the arc location) may be generated.

As a technology of suppressing the defects, as the drive current I, alternating-current drive of supplying an alternating current for repeatedly switching the polarity of the respective electrodes to the discharge lamp 90 may be used. The timing chart shown in the upper part of FIG. 7C is a timing chart showing an example of the drive current I supplied to the discharge lamp 90 (FIG. 2). The horizontal axis indicates time T and the vertical axis shows the current value of the drive current I. The drive current I shows a current flowing in the discharge lamp 90. The positive value shows the first polarity state P1 and the negative value shows the second polarity state P2. In the example shown in FIG. 7C, a square-wave alternating current is used as the drive current I. Further, in the example shown in FIG. 7C, the first polarity state P1 and the second polarity state P2 are alternately repeated. Here, a first polarity interval Tp shows a time in which the first polarity state P1 continues and a second polarity interval Tn shows a time in which the second polarity state P2 continues. Furthermore, in the example shown in FIG. 7C, the average current value of the first polarity interval Tp is Im1 and the average current value of the second polarity interval Tn is −Im2. Note that the frequency of the drive current I suitable for driving of the discharge lamp 90 may be experimentally determined according to the properties of the discharge lamp 90 (for example, a value in a range from 30 Hz to 1 kHz is employed). Similarly, other values Im1, −Im2, Tp, Tn may be experimentally determined.

The timing chart shown in the lower part of FIG. 7C is a timing chart showing a temperature change of the first electrode 92. The horizontal axis indicates time T and the vertical axis indicates temperature H. In the first polarity state P1, the temperature H of the first electrode 92 rises and, in the second polarity state P2, the temperature H of the first electrode 92 falls. Further, the first polarity state P1 and the second polarity state P2 are repeated and the temperature H periodically changes between the minimum value Hmin and the maximum value Hmax. Note that, though not illustrated, the temperature of the second electrode 93 changes at the opposite phase to the temperature H of the first electrode 92. That is, in the first polarity state P1, the temperature of the second electrode 93 falls and, in the second polarity state P2, the temperature of the second electrode 93 rises.

In the first polarity state P1, the end of the first electrode 92 (projection 552p) melts and the end of the first electrode 92 (projection 552p) becomes smoother. Thereby, the shift of the discharge location in the first electrode 92 may be suppressed. Further, the temperature of the end of the second electrode 93 (projection 562p) falls and the excessive melting of the second electrode 93 (projection 562p) may be suppressed. Thereby, unintended electrode deformation may be suppressed. In the second polarity state P2, the positions of the first electrode 92 and the second electrode 93 are opposite. Therefore, by repeating the first polarity state P1 and the second polarity state P2, the defects in the respective first electrode 92 and second electrode 93 may be suppressed.

Here, when the waveform of the drive current I is symmetric, that is, when the waveform of the drive current I satisfies the condition "|Im1|=|−Im2|, Tp=Tn", the conditions of the supplied power are the same between the first electrode 92 and the second electrode 93. Therefore, if the thermal conditions (tendencies of temperatures to rise or fall) of the first electrode 92 and the second electrode 93 are the same, the temperature difference between the first electrode 92 and the second electrode 93 is estimated to be small.

Further, if the electrode is overheated in the wide range (the arc spot (the hot spot on the electrode surface due to arc discharge) becomes larger), the electrode shape is lost due to excessive melting. Conversely, when the electrode is overcooled (the arc spot becomes smaller), the end of the electrode may not sufficiently be melt and the end may not be returned to be smooth, that is, the end of the electrode becomes more liable to deformation. Therefore, when a uniform energy supply state is continued for the electrodes, the ends of the electrodes (projection 552p and projection 562p) become more liable to deformation into unintended shapes.

Furthermore, if power supplied to the first electrode 92 and the second electrode 93 of the discharge lamp 90 is lowered and driving is continued while the lighting state of the discharge lamp 90 is maintained, the temperatures of the first electrode 92 and the second electrode 93 of the discharge lamp 90 become lower and the blackening phenomenon that the electrode material (tungsten or the like) precipitates on the envelope of the discharge lamp 90 becomes more liable to occur. When the blackening phenomenon occurs, the blackened part absorbs light and the temperature of the discharge lamp rises, the glass or the like used for the envelope is crystallized, and the devitrification phenomenon may be caused. When the devitrification phenomenon occurs, the illuminance of the discharge lamp becomes lower and the envelope becomes more liable to break.

1-5. Control Example of Drive Power in First Embodiment

Next, a specific example of control of drive power in the projector 500 according to the first embodiment will be explained.

In the first embodiment, if the operation mode is the first mode, the control unit 400 of the projector 500 controls the discharge lamp drive unit 230 to supply first power W1 to the discharge lamp 90 as drive power, and, if the operation mode is the second mode, controls the discharge lamp drive unit 230 to supply the drive power to the discharge lamp 90 while changing the drive power in a range equal to or less than second power W2 smaller than the first power W1 and equal to or more than the third power W3 smaller than the second power W2.

If the discharge lamp drive unit 230 supplies an alternating current to the discharge lamp 90 as the drive current I to supply the drive power to the discharge lamp 90, the first power W1, the second power W2, and the third power W3 may be set to average power per cycle of the drive current I.

Figure 8:
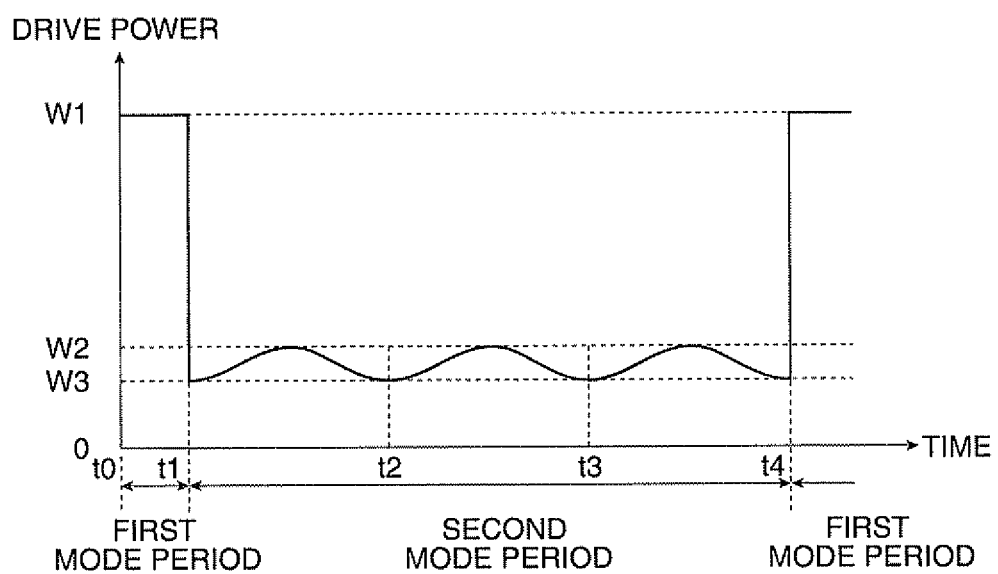
FIG. 8 is a graph for explanation of an example of control of drive power in the projector 500 according to the first embodiment.

FIG. 8 is a graph for explanation of an example of control of the drive power in the projector 500 according to the first embodiment. The horizontal axis indicates time and the vertical axis indicates the drive power of the discharge lamp 90.

In the example shown in FIG. 8, a period from time t0 to time t1 and a period after time t4 is the first mode period in which the operation mode of the projector 500 is the first mode. Further, the period from the time t1 to the time t4 is the second mode period in which the operation mode of the projector 500 is the second mode. Note that, in the first embodiment, regarding the operation modes, the first mode is set to a normal mode in which the projector 500 projects an image and the second mode is set to a standby mode in which the projector 500 takes a standby state in which the projected image is significantly made darker than in the normal mode (or no image is projected).

The control unit 400 controls the discharge lamp drive unit 230 to supply the first power W1 to the discharge lamp 90 as the drive power in the first mode period in which the operation mode is the first mode. The first power W1 may be 100% of the rated power of the discharge lamp 90, for example.

The control unit 400 controls the discharge lamp drive unit 230 to supply the drive power to the discharge lamp 90 while changing the drive power in the range equal to or less than second power W2 smaller than the first power W1 and equal to or more than the third power W3 smaller than the second power W2 in the second mode in which the operation mode is the second mode. The second power W2 may be about 30% of the rated power of the discharge lamp 90, for example. The third power W3 may be about 20% of the rated power of the discharge lamp 90, for example. The difference between the second power W2 and the third power W3 may be about 5% to 10% of the discharge lamp 90, for example.

The way of changing the drive power supplied to the discharge lamp 90 when the operation mode is the second mode may be changing in a periodic pattern or in a random manner. In the example shown in FIG. 8, the drive power supplied to the discharge lamp 90 is changed in a periodic pattern. Further, in the example shown in FIG. 8, the power of the discharge lamp 90 is changed in a periodic pattern so that sine curves may be formed with respective one cycle of the period from the time t1 to the time t2, the period from the time t2 to the time t3, and the period from the time t3 to the time t4. The length when the drive power supplied to the discharge lamp 90 is changed in a periodic pattern may be about ten seconds to one minute. Further, the intervals at which the drive power takes the maximum value in the second mode period or the intervals at which the drive power takes the minimum value in the second mode period may be about ten seconds to one minute.

According to the projector 500 of the first embodiment, since the second mode with the lower power is provided, power consumption may be suppressed. Further, according to the projector 500 of the first embodiment, in the second mode with the lower power, the discharge lamp drive unit 230 is controlled to supply the drive power to the discharge lamp 90 while changing it, and thus, the state with the lower electrode temperature of the discharge lamp 90 is not maintained in a long time. Thereby, occurrence of the blackening phenomenon of the discharge lamp 90 may be suppressed. Therefore, the projector in which deterioration of the discharge lamp may be suppressed with suppressed power consumption may be realized. In addition, since the drive power is changed in the second mode with the lower power, even when the illuminance of the discharge lamp 90 changes due to the change of the drive power, a user hardly has a feeling of discomfort.

In the projector 500 according to the first embodiment, the third power W3 may be power with which the discharge lamp 90 may maintain the lighting state. The power with which the discharge lamp 90 may maintain the lighting state is typically about 20% of the rated power of the discharge lamp 90.

By setting the third power W3 to the power with which the discharge lamp 90 may maintain the lighting state, the discharge lamp 90 may maintain the lighting state both in the first mode and the second mode. Therefore, it is not necessary to relight the discharge lamp 90 when the operation mode is changed from the second mode to the first mode, and the operation mode may be changed in a short time.

1-6. Control Example of Drive Current in First Embodiment

Next, a specific example of control of the drive current I in the projector 500 of the first embodiment will be explained.

Figure 9:
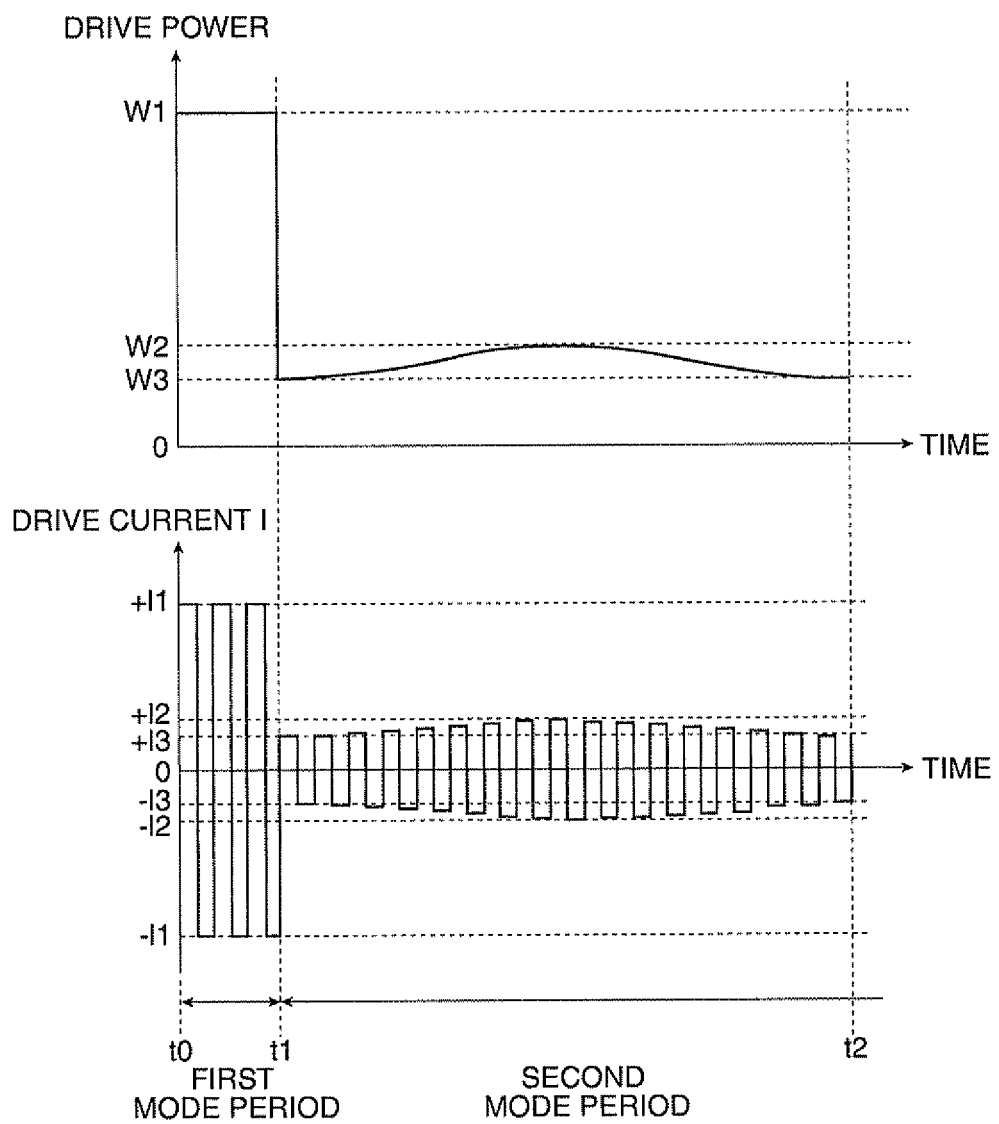
FIG. 9 is a timing chart schematically showing an example of a relationship between the drive power and the drive current I in the projector 500 according to the first embodiment.

FIG. 9 is a timing chart schematically showing an example of a relationship between the drive power and the drive current I in the projector 500 according to the first embodiment. The horizontal axis of the upper graph of FIG. 9 indicates time, and the vertical axis indicates the drive power of the discharge lamp 90. The horizontal axis of the lower graph of FIG. 9 indicates time, and the vertical axis indicates the drive current I of the discharge lamp 90. Further, in the lower graph of FIG. 9, the drive current I when the first electrode 92 of the discharge lamp 90 is the anode (the second electrode 93 is the cathode) is shown as a positive value and the drive current I when the second electrode 93 of the discharge lamp 90 is the anode (the first electrode 92 is the cathode) is shown as a negative value.

The upper graph of FIG. 9 is a graph corresponding to the period from the time t0 to the time t2 of the graph shown in FIG. 8. The lower graph of FIG. 9 schematically shows the drive current I corresponding to the upper graph of FIG. 9, i.e., the drive current I in the period from the time t0 to the time t2.

When the drive voltage V1a of the discharge lamp 90 is constant, the drive power and the absolute value of the drive current I of the discharge lamp 90 have a proportional relationship. Therefore, by changing the drive current I of the discharge lamp 90, the drive power of the discharge lamp 90 may be changed.

In the first embodiment, the discharge lamp drive unit 230 supplies the drive power to the discharge lamp 90 by supplying an alternating current to the discharge lamp 90 as the drive current I. The advantage of supplying an alternating current to the discharge lamp 90 as the drive current I by supplying has been described in the section "1-4. Relationship between Polarity of Drive Current and Electrode Temperature".

In the example shown in FIG. 9, the absolute value of the drive current I is constant in the period of one cycle of the drive current I. That is, the waveform of the drive current I is the so-called rectangular waveform. Note that the waveform of the drive current I is not limited to that, but maybe a waveform in which the absolute value of the drive current I takes different values in the period of one cycle of the drive current I such as a waveform in which the absolute value of the drive current I starts in the period to be the first current value and ends in the period to be the second current value larger than the first current value in the period of a half cycle of the drive current I or a waveform in which the absolute value of the drive current I monotonically increases in the period of a half cycle of the drive current I.

In the first embodiment, the control unit 400 may control the discharge lamp drive unit 230 to supply the drive power to the discharge lamp 90 while changing the drive power so that the average value of the drive power per cycle may be changed when the operation mode is the second mode. In this case, when the drive power is changed in a periodic pattern, the cycle of the change of the drive power is longer than the cycle of the drive current I.

In the example shown in FIG. 9, for example, when the average values of the drive power are sequentially calculated with respect to each cycle of the drive current I, there are periods in which the average values of the drive power are different from each other in the second mode period.

Further, in the second mode period, the absolute value of the drive current I may be changed with respect to each cycle of the drive current I. In this case, the drive power changes to take different values in a stepwise manner. That is, the average values of the drive power per cycle of the drive current I are changed with respect to each cycle of the drive current I.

According to the projector 500 of the first embodiment, when the operation mode is the second mode, the control unit 400 controls the discharge lamp drive unit 230 to supply the drive power to the discharge lamp 90 so that the average value of the drive power per cycle of the drive current I may be changed, and thus, the electrode temperature of the discharge lamp 90 may be reliably raised. Thereby, the state with the lower electrode temperature of the discharge lamp 90 may not be maintained in a long time. Therefore, occurrence of the blackening phenomenon of the discharge lamp 90 may be suppressed.

1-7. Modified Examples of Control of Drive Power

Figure 10A:
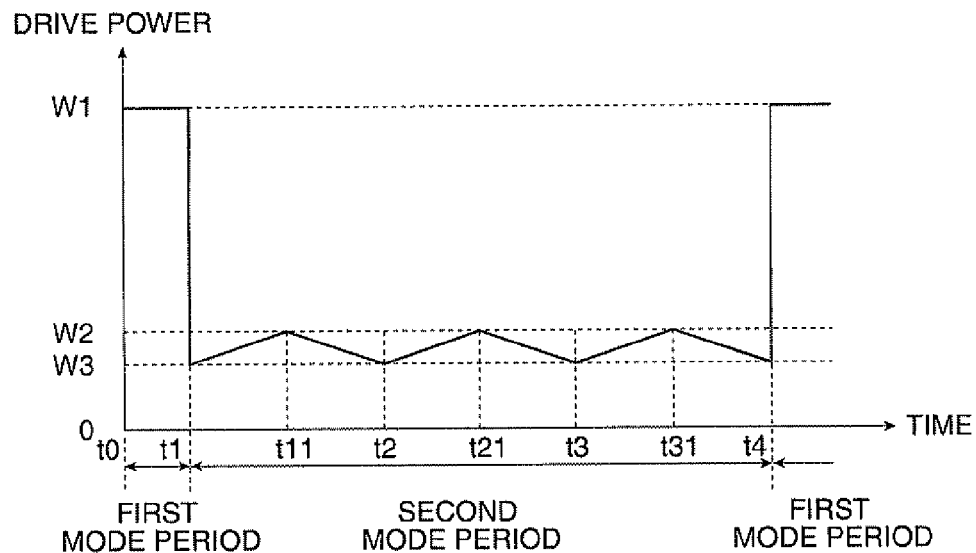
FIGS. 10A and 10B are graphs for explanation of a modified example of the control of the drive power in the projector 500 according to the first embodiment.
Figure 10B:
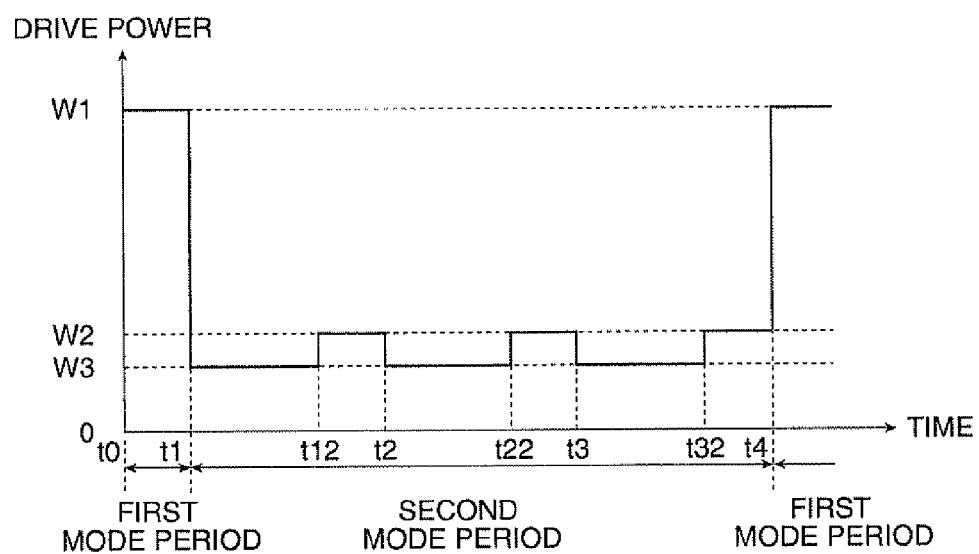

FIGS. 10A and 10B are graphs for explanation of modified examples of the control of the drive power in the projector 500 according to the first embodiment. The horizontal axis indicates time and the vertical axis indicates the drive power of the discharge lamp 90. As below, the difference from the control explained using FIG. 8 will be explained.

In the example shown in FIG. 10A, the drive power of the discharge lamp 90 is changed in a periodic pattern. Further, in the example shown in FIG. 10A, the drive power of the discharge lamp 90 is changed in a periodic pattern so that the drive power may linearly and monotonically increase from the third power W3 to the second power W2 in a period from time t1 to time t11, a period from time t2 to time t21, and a period from time t3 to time t31, and the drive power may linearly and monotonically decrease from the second power W2 to the third power W3 in a period from time t11 to time t2, a period from time t21 to time t3, and a period from time t31 to time t4.

In the example shown in FIG. 10B, the drive power of the discharge lamp 90 is changed in a periodic pattern. Further, in the example shown in FIG. 10B, the drive power of the discharge lamp 90 is changed in a periodic pattern so that the drive power may constantly be the third power W3 in a period from time t1 to time t12, a period from time t2 to time t22, and a period from time t3 to time t32, and the drive power may constantly be the second power W2 in a period from time t12 to time t2, a period from time t22 to time t3, and a period from time t32 to time t4. Furthermore, in the example shown in FIG. 10B, the drive power of the discharge lamp 90 is changed in the periodic pattern such that the length of the period in which the drive power is larger than the average value of the drive power in the second mode period (in FIG. 10B, the period in which the drive power is the second power W2) and the length of the period in which the drive power is smaller than the average value of the drive power in the second mode period (in FIG. 10B, the period in which the drive power is the third power W3) may be different.

Also, in the examples shown in FIGS. 10A and 10B, the second mode with the lower power is provided, and thereby, power consumption may be suppressed. Further, also, in the examples shown in FIGS. 10A and 10B, in the second mode with the lower power, the discharge lamp drive unit 230 is controlled to supply the drive power to the discharge lamp 90 while changing it, and thus, the state with the lower electrode temperature of the discharge lamp 90 is not maintained in a long time. Thereby, occurrence of the blackening phenomenon of the discharge lamp 90 may be suppressed. Therefore, the projector in which deterioration of the discharge lamp maybe suppressed with suppressed power consumption may be realized. In addition, since the drive power is changed in the second mode with the lower power, even when the illuminance of the discharge lamp 90 changes due to the change of the drive power, a user hardly has a feeling of discomfort.

In the first embodiment, the projector having one light source including the discharge lamp has been explained as an example, however, the invention is not limited to that, but may be applied to a projector having two or more light sources including discharge lamps.

Figure 11:
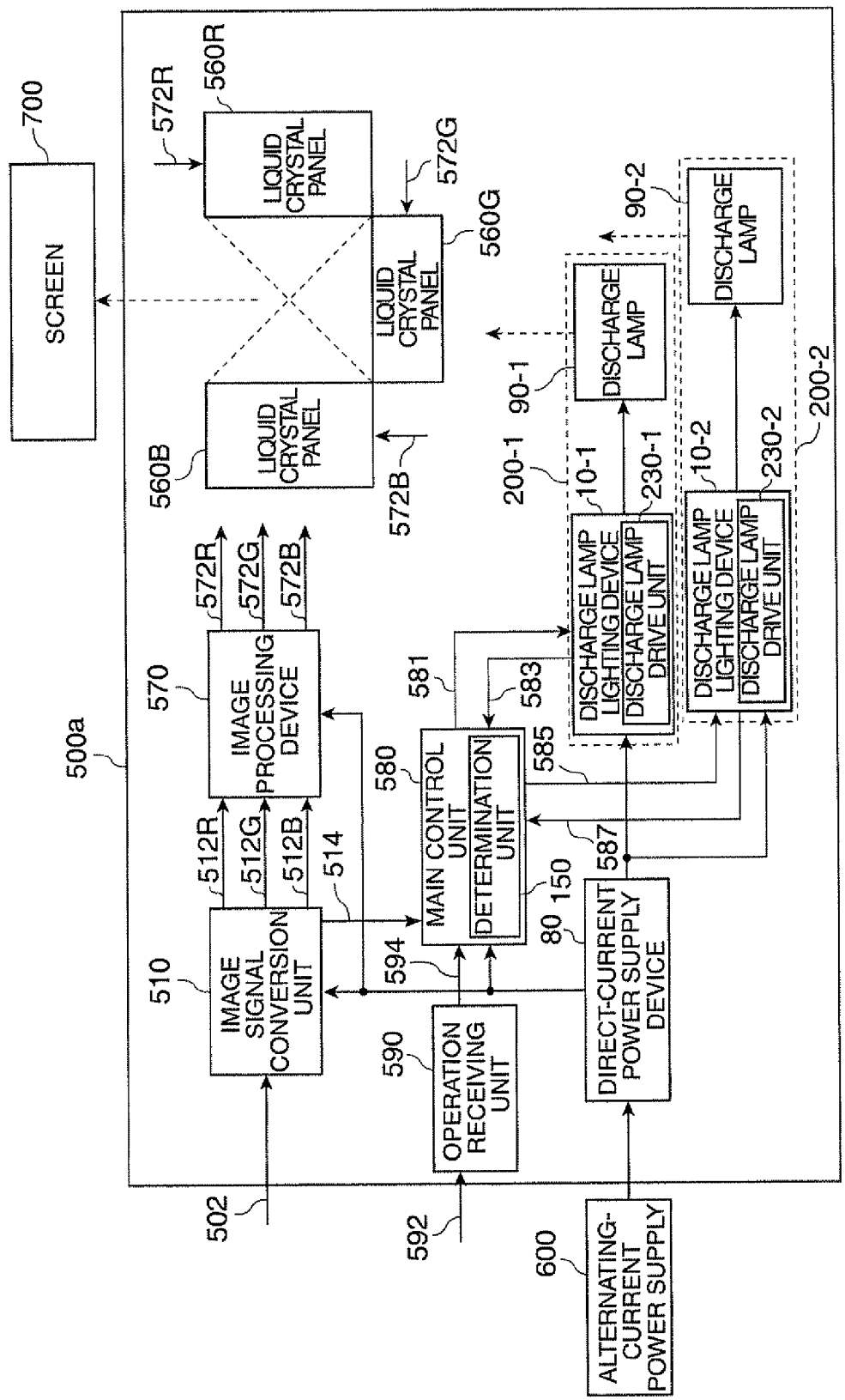
FIG. 11 shows an example of a circuit configuration of a projector 500a according to the second embodiment.

2. Projector according to Second Embodiment 2-1. Circuit Configuration of Projector according to Second Embodiment FIG. 11 shows an example of a circuit configuration of a projector 500a according to the second embodiment of the invention. The same signs are assigned to the same configurations as those of the circuit of the projector 500 that has been explained using FIG. 3, and their detailed explanation will be omitted.

The projector 500a according to the second embodiment includes plural light sources. More specifically, the projector 500a according to the second embodiment has two light sources 200-1 and 200-2. Note that the configurations of the light sources 200-1 and 200-2 are the same as that of the light source 200 that has been explained using FIG. 2. Further, the number of light sources may be three or more as long as it is more than one.

The plural light sources 200-1 and 200-2 each includes a discharge lamp, a discharge lamp drive unit that supplies drive power to the discharge lamp to drive the discharge lamp. In the example shown in FIG. 11, the light source 200-1 has a discharge lamp 90-1, and a discharge lamp lighting device 10-1 including a discharge lamp drive unit 230-1 that supplies drive power to the discharge lamp 90-1 to drive the discharge lamp 90-1. Similarly, the light source 200-2 has a discharge lamp 90-2, and a discharge lamp lighting device 10-2 including a discharge lamp drive unit 230-2 that supplies drive power to the discharge lamp 90-2 to drive the discharge lamp 90-2.

The discharge lamp lighting device 10-1 forms a discharge path by generating a high voltage between the electrodes of the discharge lamp 90-1 at startup to cause dielectric breakdown, and subsequently, supplies drive power using the discharge lamp drive unit 230-1 of the discharge lamp lighting device 10-1 supplying a drive current for the discharge lamp 90-1 to maintain discharge. The discharge lamp lighting device 10-2 forms a discharge path by generating a high voltage between the electrodes of the discharge lamp 90-2 at startup to cause dielectric breakdown, and subsequently, supplies drive power using the discharge lamp drive unit 230-2 of the discharge lamp lighting device 10-2 supplying a drive current for the discharge lamp 90-2 to maintain discharge.

The main control unit 580 controls the operation from starting of turning on to turning off of the projector 500a. In the second embodiment, the main control unit 580 has a first mode and a second mode as operation modes and controls the light sources 200-1 and 200-2 according to the operation modes.

The main control unit 580 may output a turn-on command and a turn-off command, for example, to the discharge lamp lighting device 10-1 of the light source 200-1 via a communication signal 581, or output them to the discharge lamp lighting device 10-2 of the light source 200-2 via a communication signal 585. Further, the main control unit 580 may receive lighting information representing the lighting state of the discharge lamp 90-1 from the discharge lamp lighting device 10-1 of the light source 200-1 via a communication signal 583, or receive lighting information representing the lighting state of the discharge lamp 90-2 from the discharge lamp lighting device 10-2 of the light source 200-2 via a communication signal 587. Furthermore, the main control unit 580 may receive information on the operation 592 received by the operation receiving unit 590 via a communication signal 594.

In addition, the main control unit 580 may function as a determination unit 150 that determines whether the operation mode of the projector 500a is the first mode or the second mode. The specific example of the operation modes and the determination criterion of the determination unit 150 have been explained in the section of "1-2. Circuit Configuration of Projector according to First Embodiment".

The determination unit 150 may output operation mode information as information on the determined operation mode to the discharge lamp lighting device 10-1 of the light source 200-1 via the communication signal 581 to the discharge lamp lighting device 10-2 of the light source 200-2 via the communication signal 585.

The configuration examples of the discharge lamp lighting device 10-1 and the discharge lamp lighting device 10-2 are the same as that of the discharge lamp lighting device that has been explained in the section of "1-3. Configuration of Discharge Lamp Lighting Device in First Embodiment".

Note that, in the example shown in FIG. 11, the light source control unit (not shown) contained in the discharge lamp lighting device 10-1, the light source control unit (not shown) contained in the discharge lamp lighting device 10-2, and the main control unit 580 collectively correspond to the control unit 400. Note that part or the entire of the function of the control unit 400 may be performed by the light source control units contained in the discharge lamp lighting device 10-1 and the discharge lamp lighting device 10-2 or performed by the main control unit 580.

2-2. Control Example of Drive Power in Second Embodiment

Next, a specific example of control of the drive power in the projector 500a according to the second embodiment will be explained.

In the second embodiment, if the operation mode is the first mode, the control unit 400 of the projector 500a controls the respective discharge lamp drive units 230-1 and 230-2 to supply first power W1 to the respective discharge lamps 90-1 and 90-2 as the drive power. Further, if the operation mode is the second mode, the control unit 400 of the projector 500a controls the respective discharge lamp drive units 230-1 and 230-2 to supply the drive power to the respective discharge lamps 90-1 and 90-2 while changing the drive power supplied to the respective discharge lamps 90-1 and 90-2 so that the drive power supplied to the respective discharge lamps 90-1 and 90-2 may be in a range equal to or less than second power W2 smaller than the first power W1 and equal to or more than the third power W3 smaller than the second power W2 and a change width of the total value of the drive power supplied to the respective discharge lamps 90-1 and 90-2 may be equal to or less than the difference between the second power W2 and the third power W3.

If the discharge lamp drive units 230-1 and 230-2 supply alternating currents to the discharge lamps 90-1 and 90-2 as the drive currents I to supply drive power to the discharge lamps 90-1 and 90-2, the first power W1, the second power W2, and the third power W3 may be set to average power per cycle of the drive current.

Figure 12A:
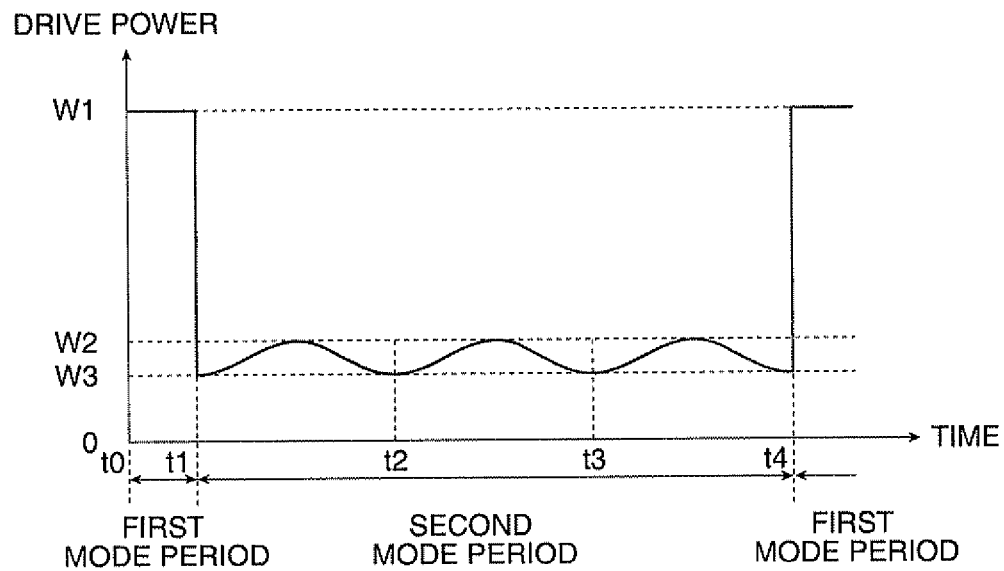
FIGS. 12A and 12B are graphs for explanation of examples of control of drive power in the projector 500a according to the second embodiment.
Figure 12B:
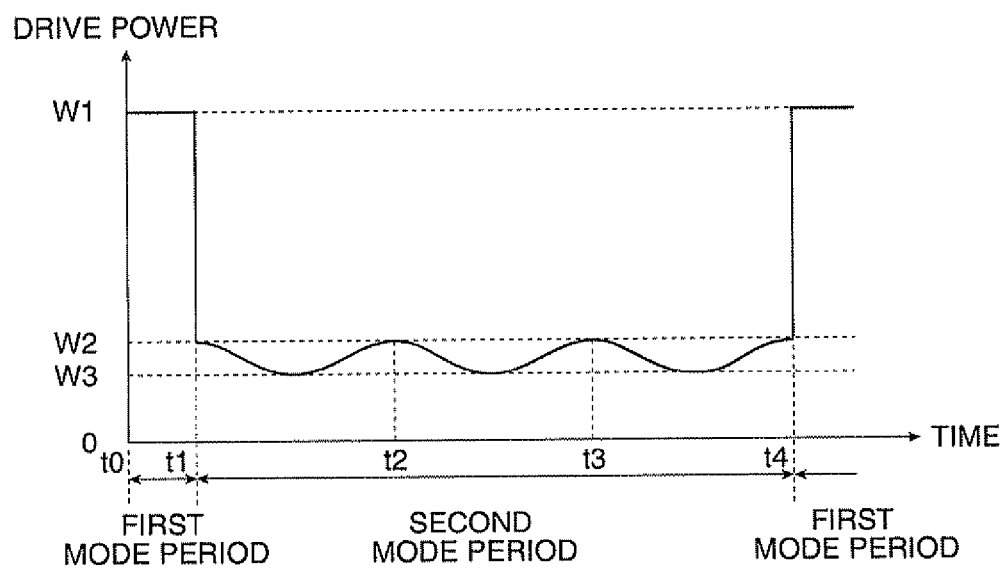

FIGS. 12A and 12B are graphs for explanation of an example of control of the drive power in the projector 500a according to the second embodiment. The horizontal axis of FIG. 12A indicates time and the vertical axis indicates the drive power supplied to the discharge lamp 90-1. The horizontal axis of FIG. 12B indicates time and the vertical axis indicates the drive power supplied to the discharge lamp 90-2.

In the examples shown in FIGS. 12A and 123, a period from time t0 to time t1 and a period after time t4 are the first mode periods in which the operation mode of the projector 500a is the first mode. Further, the period from the time t1 to the time t4 is the second mode period in which the operation mode of the projector 500a is the second mode. Note that, in the second embodiment, regarding the operation modes, the first mode is set to a normal mode in which the projector 500a projects an image and the second mode is set to a standby mode in which the projector 500a takes a standby state in which the projected image is significantly made darker than in the normal mode (or no image is projected).

The control unit 400 controls the discharge lamp drive unit 230 to supply the first power W1 to the discharge lamps 90-1 and 90-2 as drive power in the first mode period in which the operation mode is the first mode. The first power W1 may be 100% of the rated power of the discharge lamps 90-1 and 90-2, for example.

The control unit 400 controls the discharge lamp drive units 230-1 and 230-2 to supply drive power to the discharge lamps 90-1 and 90-2 while changing the drive power in the range equal to or less than the second power W2 smaller than the first power W1 and equal to or more than the third power W3 smaller than the second power W2 in the second mode period in which the operation mode is the second mode. The second power W2 may be about 30% of the rated power of the discharge lamp 90, for example. The third power W3 may be about 20% of the rated power of the discharge lamp 90, for example. The difference between the second power W2 and the third power W3 may be about 5% to 10% of the discharge lamp 90, for example.

The way of changing the drive power supplied to the discharge lamps 90-1 and 90-2 when the operation mode is the second mode may be changing in a periodic pattern or in a random manner. In the example shown in FIGS. 12A and 12B, the drive power supplied to the discharge lamps 90-1 and 90-2 is changed in a periodic pattern. Further, in the example shown in FIGS. 12A and 12B, the drive power of the discharge lamps 90-1 and 90-2 is changed in a periodic pattern so that sine curves may be formed with respective one cycle of the period from the time t1 to the time t2, the period from the time t2 to the time t3, and the period from the time t3 to the time t4. The length when the drive power is changed in a periodic pattern may be about ten seconds to one minute, for example. Further, the intervals at which the drive power takes the maximum value in the second mode period or the intervals at which the drive power takes the minimum value in the second mode period may be about ten seconds to one minute, for example.

According to the projector 500a of the second embodiment, since the second mode with the lower power is provided, power consumption may be suppressed. Further, according to the projector 500a of the second embodiment, in the second mode with the lower power, the discharge lamp drive units 230-1 and 230-2 are controlled to supply the drive power to the discharge lamps 90-1 and 90-2 while changing it, and thus, the states with the lower electrode temperatures of the discharge lamps 90-1 and 90-2 are not maintained in a long time. Thereby, occurrence of the blackening phenomenon of the discharge lamps 90-1 and 90-2 may be suppressed. Therefore, the projector in which deterioration of the discharge lamp may be suppressed with suppressed power consumption may be realized.

In the second mode period in which the operation mode is the second mode, the control unit 400 controls the discharge lamp drive units 230-1 and 230-2 so that the change widths of the total values of the drive power supplied to the respective discharge lamps 90-1 and 90-2 may be less than 2×(W2−W3) as a value twice the difference between the second power W2 and the third power W3.

Figure 13:
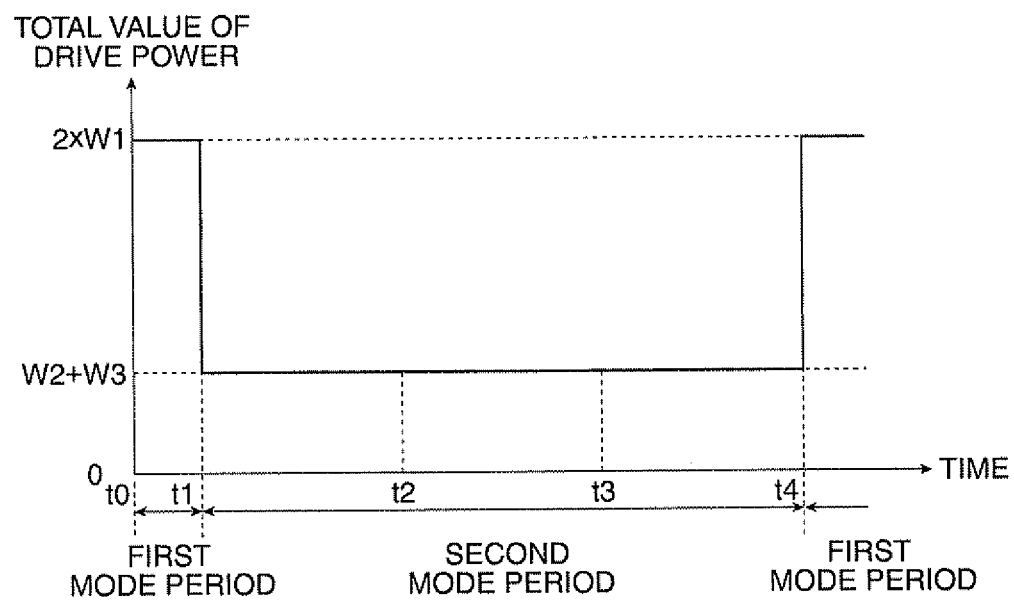
FIG. 13 is a graph for explanation of an example of the control of the drive power in the projector 500a according to the second embodiment.

FIG. 13 is a graph for explanation of an example of the control of the drive power in the projector 500a according to the second embodiment. The horizontal axis of FIG. 13 indicates time and the vertical axis indicates the total value of the drive power supplied to the discharge lamps 90-1 and 90-2.

In the example shown in FIGS. 12A and 12B, in the second mode period, the drive power of the discharge lamps 90-1 and 90-2 is changed in the periodic pattern so that the drive power supplied to the discharge lamp 90-1 (FIG. 12A) and the drive power supplied to the discharge lamp 90-2 (FIG. 12B) may form sine curves at phases shifted from each other by 180°. Therefore, as shown in FIG. 13, in the second mode period, the total values of the drive power supplied to the discharge lamps 90-1 and 90-2 are constant values of (W2+W3). That is, the change widths of the total values of the drive power supplied to the discharge lamps 90-1 and 90-2 are zero.

Figure 14A:
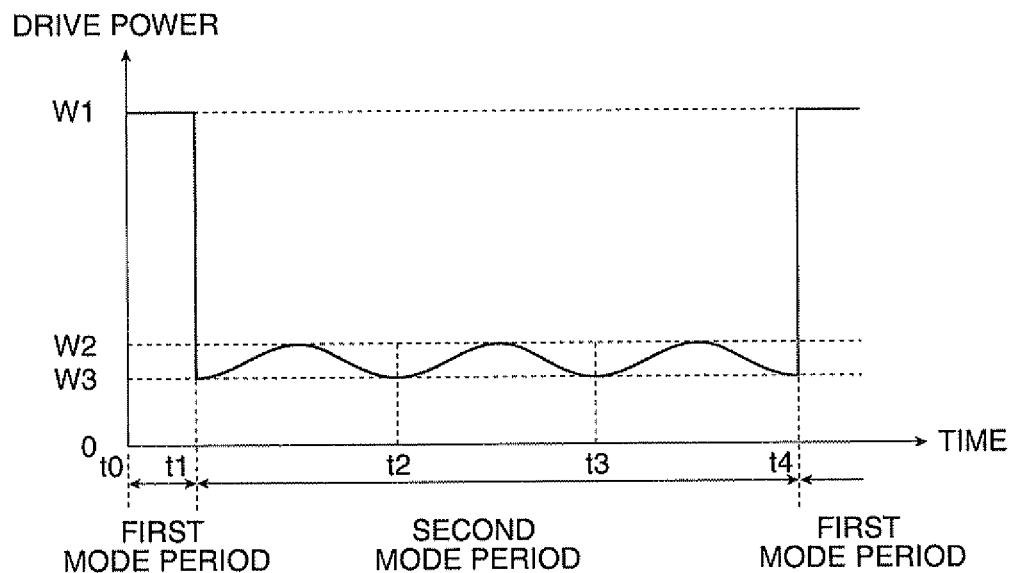
FIGS. 14A and 14B are graphs for explanation of another example of the control of the drive power in the projector 500a according to the second embodiment.
Figure 14B:
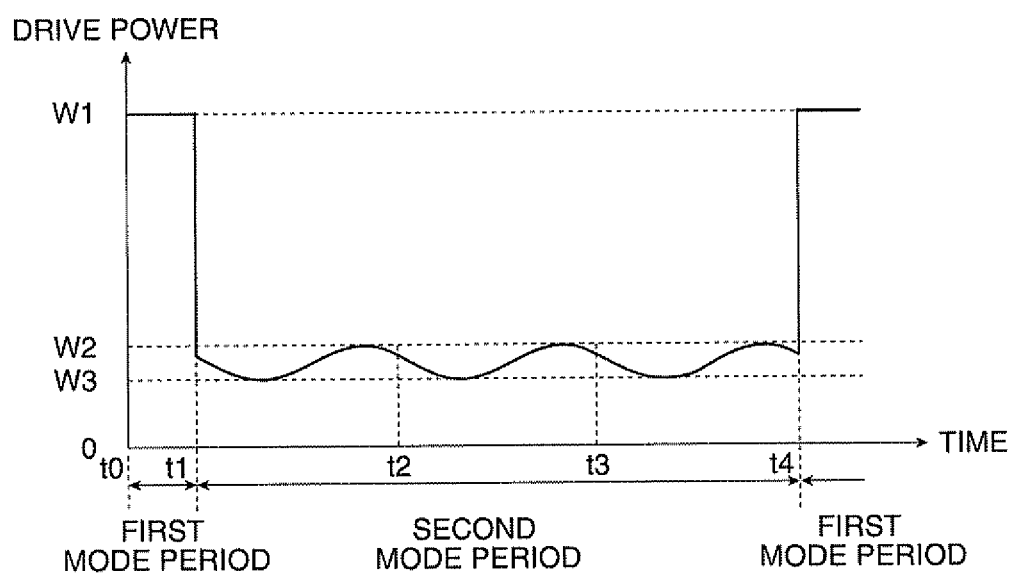
Figure 15:
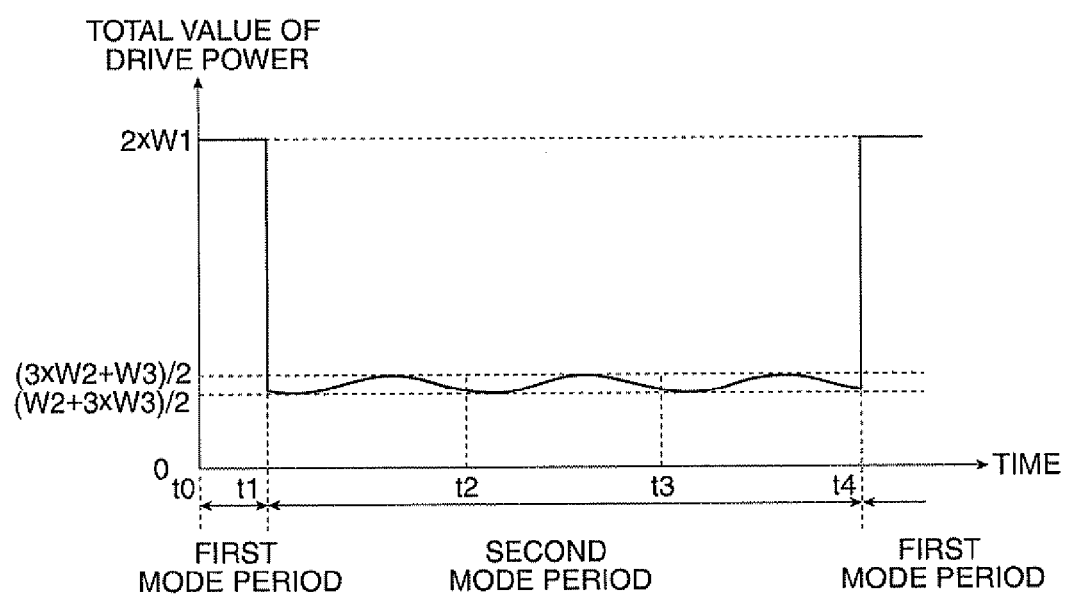
FIG. 15 is a graph for explanation of another example of the control of the drive power in the projector 500a according to the second embodiment.

FIGS. 14A, 14B, and 15 are graphs for explanation of another example of the control of the drive power in the projector 500a according to the second embodiment. The horizontal axis of FIG. 14A indicates time and the vertical axis indicates the drive power supplied to the discharge lamp 90-1. The horizontal axis of FIG. 14B indicates time and the vertical axis indicates the drive power supplied to the discharge lamp 90-2. The horizontal axis of FIG. 15 indicates time and the vertical axis indicates the total value of the drive power supplied to the discharge lamps 90-1 and 90-2.

In the example shown in FIGS. 14A and 14B, in the second mode period, the drive power of the discharge lamps 90-1 and 90-2 is changed in the periodic pattern so that the drive power supplied to the discharge lamp 90-1 (FIG. 14A) and the drive power supplied to the discharge lamp 90-2 (FIG. 14B) may form sine curves at phases shifted from each other by 120°. Therefore, as shown in FIG. 15, in the second mode period, the total value of the drive power supplied to the discharge lamps 90-1 and 90-2 varies in a range from (W2+3×W3)/2 to (3×W2+W3)/2. That is, the change width of the total value of the drive power supplied to the discharge lamps 90-1 and 90-2 is less than 2×(W2−W3). Note that, in the case where the change patterns of the drive power of the discharge lamps 90-1 and 90-2 may be sine waveforms having the same frequency and amplitude, if there is a phase difference θ between the periodic pattern corresponding to the change of the drive power of the discharge lamp 90-1 and the periodic pattern corresponding to the change of the drive power of the discharge lamp 90-2, the change width of the total value of the drive power supplied to the discharge lamps 90-1 and 90-2 is less than 2×(W2−W3).

When the specifications of the discharge lamps 90-1 and 90-2 are the same, the illuminance of the discharge lamps 90-1 and 90-2 is generally proportional to the supplied drive power. Further, when ratios of the maximum value to the minimum value of the variation range of the drive power are the same, the illumination variations are equal. Specifically, the illumination variations when the drive power is varied in a range from W2 to W3 in a single body of the discharge lamp 90-1 or the discharge lamp 90-2 and the illumination variations when the drive power is varied in a range from 2×W2 to 2×W3 if the change patterns of the drive power of the discharge lamp 90-1 and the discharge lamp 90-2 are made the same (phase difference θ=0) are generally equal. Therefore, according to the projector 500a of the second embodiment, the change widths of the total values of the drive power supplied to the respective discharge lamps 90-1 and 90-2 may be less than 2×(W2−W3) as the value twice the difference between the second power W2 and the third power W3, and thus, the change of the illuminance of the projector due to the change of the drive power is smaller compared to the case where there is one discharge lamp. Therefore, the projector that hardly brings a feeling of discomfort to a user may be realized.

In the projector 500a according to the second embodiment, the third power W3 may be power with which the discharge lamps 90-1 and 90-2 may maintain the lighting states. The power with which the discharge lamps 90-1 and 90-2 may maintain the lighting states is typically equal to or more than about 20% of the rated power of the discharge lamps 90-1 and 90-2.

By setting the third power W3 to the power with which the discharge lamps 90-1 and 90-2 may maintain the lighting states, the discharge lamps 90-i and 90-2 may maintain the lighting states both in the first mode and the second mode. Therefore, it is not necessary to relight the discharge lamps 90-1 and 90-2 when the operation mode is changed from the second mode to the first mode, and the operation mode maybe changed in a short time.

2-3. Control Example of Drive Current in Second Embodiment

Next, a specific example of control of the drive current in the projector 500a according to the second embodiment will be explained.

The timing chart shown in FIG. 9 similarly holds in the second embodiment. In the following description, the horizontal axis of the upper graph of FIG. 9 indicates time and the vertical axis indicates the drive power of the discharge lamp 90-1, and the horizontal axis of the lower graph of FIG. 9 indicates time and the vertical axis indicates the drive current I of the discharge lamp 90-1. Further, in the lower graph of FIG. 9, the drive current I when the first electrode 92-1 of the discharge lamp 90-1 is the anode (the second electrode 93-1 is the cathode) is shown as a positive value and the drive current I when the second electrode 93-1 of the discharge lamp 90-1 is the anode (the first electrode 92-1 is the cathode) is shown as a negative value. Note that, though the relationship between the drive power and the drive current I in the discharge lamp 90-1 will be mainly explained as below, the same is applicable to the discharge lamp 90-2.

The upper graph of FIG. 9 also holds as a graph corresponding to the period from the time t0 to the time t2 of the graph shown in FIG. 12A. In this case, similarly, the lower graph of FIG. 9 is a graph schematically showing the drive current I corresponding to the upper graph of FIG. 9, i.e., the drive current I in the period from the time t0 to the time t2.

When the drive voltage V1a of the discharge lamp 90-1 is constant, the drive power and the absolute value of the drive current I of the discharge lamp 90-1 have a proportional relationship. Therefore, by changing the drive current I of the discharge lamp 90-1, the drive power of the discharge lamp 90-1 may be changed.

In the second embodiment, the respective discharge lamp drive units 230-1 and 230-2 supply the drive power to the discharge lamps 90-1 and 90-2 by supplying alternating currents to the discharge lamps 90-1 and 90-2 as the drive currents I. The advantage of supplying alternating currents to the discharge lamps 90-1 and 90-2 as the drive currents I has been described in the section "1-4. Relationship between Polarity of Drive Current and Electrode Temperature".

In the example shown in FIG. 9, the absolute value of the drive current I is constant in the period of one cycle of the drive current I. That is, the waveform of the drive current I is the so-called rectangular waveform. Note that the waveform of the drive current I is not limited to that, but may be a waveform in which the absolute value of the drive current I takes different values in the period of one cycle of the drive current I such that a waveform in which the absolute value of the drive current I starts in the period to be the first current value and ends in the period to be the second current value larger than the first current value in the period of a half cycle of the drive current I or a waveform in which the absolute value of the drive current I monotonically increases in the period of a half cycle of the drive current I.

In the second embodiment, the control unit 400 may control the discharge lamp drive units 230-1 and 230-2 to supply the drive power to the respective discharge lamps 90-1 and 90-2 while changing the drive power so that the average values of the drive power per cycle of the respective drive currents I may be changed when the operation mode is the second mode. In this case, when the drive power is changed in a periodic pattern, the cycle of the change of the drive power is longer than the cycle of the drive current I.

In the example shown in FIG. 9, for example, when the average values of the drive power are sequentially calculated with respect to each cycle of the drive current I, there are periods in which the average values of the drive power are different from each other in the second mode period.

Further, in the second mode period, the absolute value of the drive current I may be changed with respect to each cycle of the drive current I. In this case, the drive power changes to take different values in a stepwise manner. That is, the average values of the drive power per cycle of the drive current I are changed with respect to each cycle of the drive current I.

According to the projector 500a of the second embodiment, when the operation mode is the second mode, the control unit 400 controls the discharge lamp drive units 230-1 and 230-2 to supply the drive power to the discharge lamps 90-1 and 90-2 while changing the drive power to change the average value of the drive power per cycle of the drive current I, and thus, the electrode temperatures of the discharge lamps 90-1 and 90-2 maybe reliably raised. Thereby, the states with the lower electrode temperatures of the discharge lamps 90-1 and 90-2 are not maintained in a long time. Therefore, occurrence of the blackening phenomenon of the discharge lamps 90-1 and 90-2 may be suppressed.

2-4. Modified Examples of Control of Drive Power

Figure 16A:
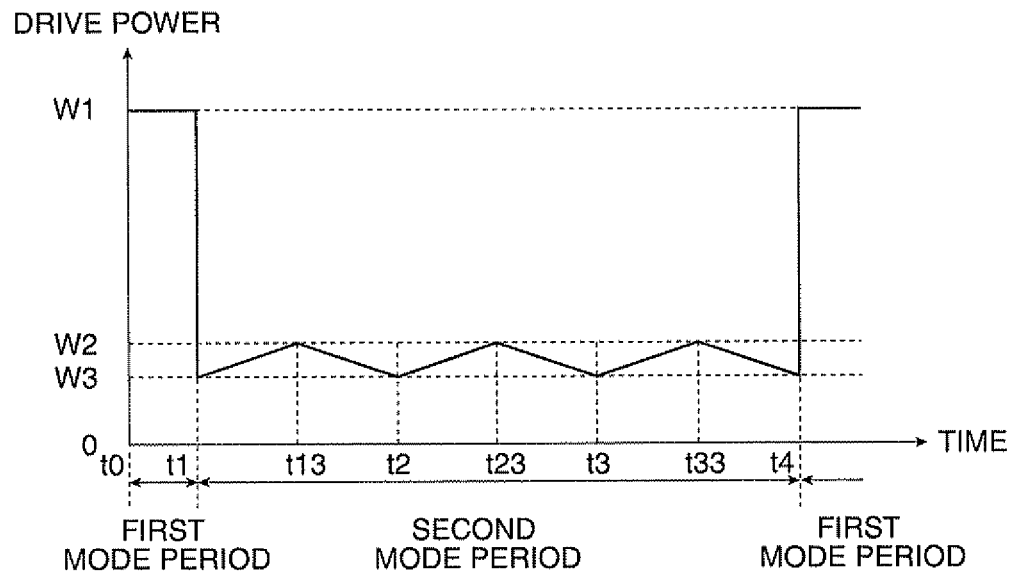
FIGS. 16A and 16B are graphs for explanation of a modified example of the control of the drive power in the projector 500a according to the second embodiment.
Figure 16B:
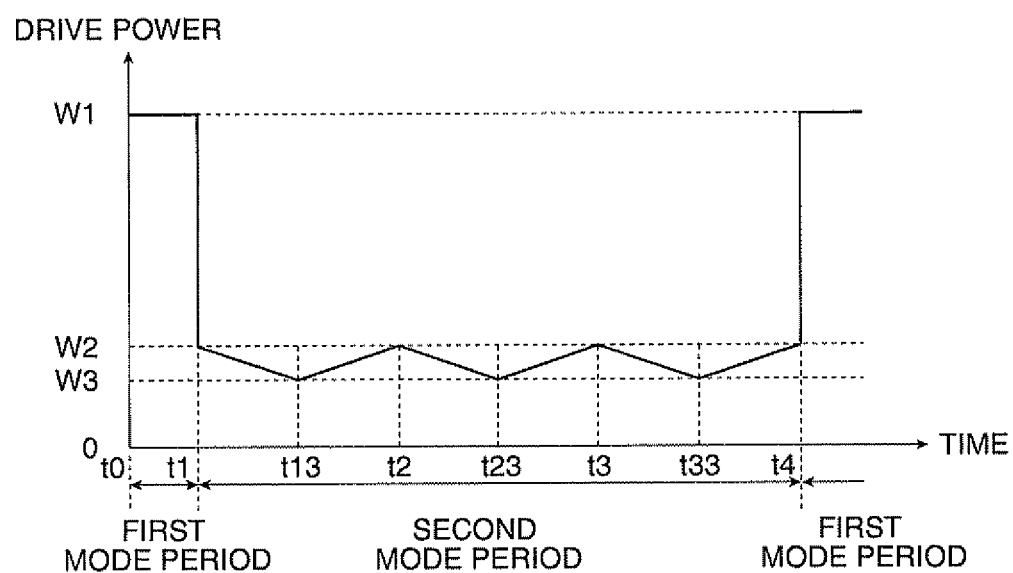

FIGS. 16A and 16B are graphs for explanation of a modified example of the control of the drive power in the projector 500a according to the second embodiment. The horizontal axis of FIG. 16A indicates time and the vertical axis indicates the drive power of the discharge lamp 90-1. The horizontal axis of FIG. 16B indicates time and the vertical axis indicates the drive power of the discharge lamp 90-2. As below, the difference from the control that has been explained using FIGS. 12A and 12B will be centered in explanation.

In the example shown in FIG. 16A, the drive power supplied to the discharge lamp 90-1 is changed in a periodic pattern. Further, in the example shown in FIG. 16A, the drive power supplied to the discharge lamp 90-1 is changed in a periodic pattern so that the drive power may linearly and monotonically increase from the third power W3 to the second power W2 in a period from time t1 to time t13, a period from time t2 to time t23, and a period from time t3 to time t33, and the drive power may linearly and monotonically decrease from the second power W2 to the third power W3 in a period from time t13 to time t2, a period from time t23 to time t3, and a period from time t33 to time t4.

In the example shown in FIG. 16B, the drive power supplied to the discharge lamp 90-2 is changed in a periodic pattern. Further, in the example shown in FIG. 16B, the drive power of the discharge lamp 90-2 is changed in a periodic pattern so that the drive power may linearly and monotonically decrease from the second power W2 to the third power W3 in a period from time t1 to time t13, a period from time t2 to time t23, and a period from time t3 to time t33, and the drive power may linearly and monotonically increase from the third power W3 to the second power W2 in a period from time t13 to time t2, a period from time t23 to time t3, and a period from time t33 to time t4.

By supplying the drive power to the discharge lamps 90-1 and 90-2 in the manner as shown in FIGS. 16A and 16B, in the second mode period, the total value of the drive power supplied to the discharge lamps 90-1 and 90-2 is a constant value of (W2+W3). That is, the change width of the total value of the drive power supplied to the discharge lamps 90-1 and 90-2 is zero.

Figure 17A:
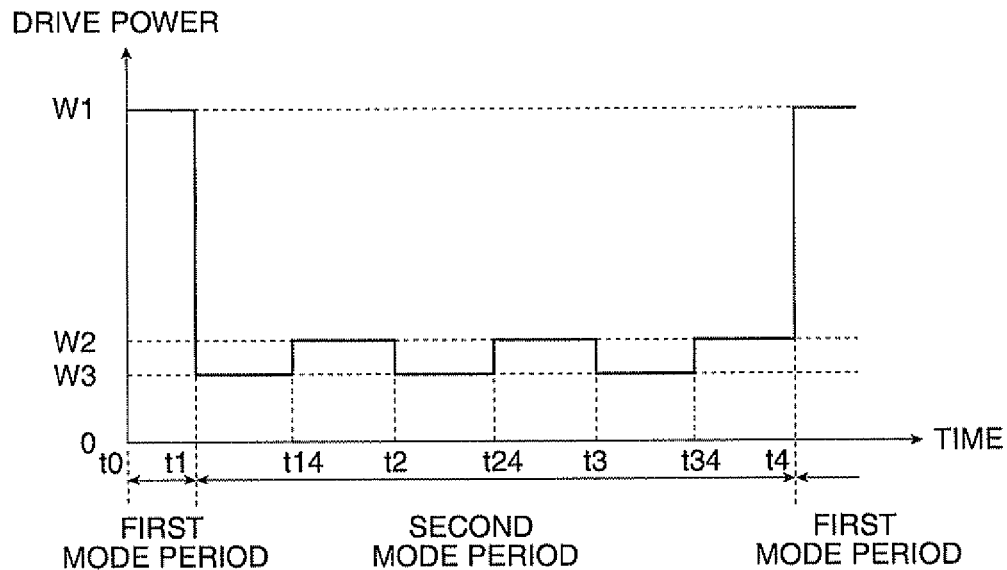
FIGS. 17A and 17B are graphs for explanation of another modified example of the control of the drive power in the projector 500a according to the second embodiment.
Figure 17B:
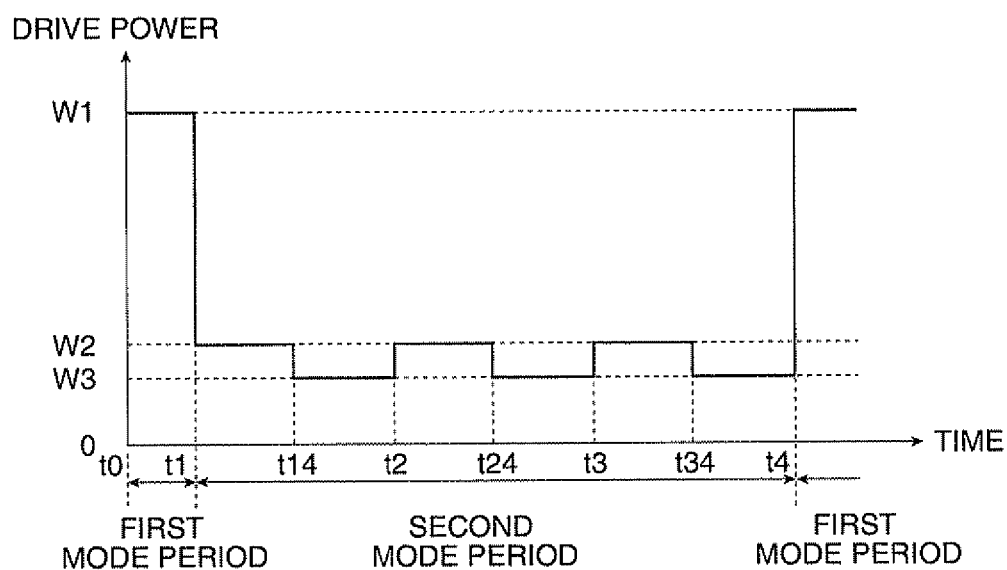

FIGS. 17A and 17B are graphs for explanation of another modified example of the control of the drive power in the projector 500a according to the second embodiment. The horizontal axis of FIG. 17A indicates time and the vertical axis indicates the drive power of the discharge lamp 90-1. The horizontal axis of FIG. 17B indicates time and the vertical axis indicates the drive power of the discharge lamp 90-2. As below, the difference from the control that has been explained using FIGS. 12A and 12B will be centered in explanation.

In the example shown in FIG. 17A, the drive power supplied to the discharge lamp 90-1 is changed in a periodic pattern. Further, in the example shown in FIG. 17A, the drive power supplied to the discharge lamp 90-1 is changed in a periodic pattern so that the drive power may constantly be the third power W3 in a period from time t1 to time t14, a period from time t2 to time t24, and a period from time t3 to time t34, and the drive power may constantly be the second power W2 in a period from time t14 to time t2, a period from time t24 to time t3, and a period from time t34 to time t4.

In the example shown in FIG. 17B, the drive power supplied the discharge lamp 90-2 is changed in a periodic pattern. Further, in the example shown in FIG. 17B, the drive power supplied to the discharge lamp 90-2 is changed in a periodic pattern so that the drive power may constantly be the second power W2 in a period from time t1 to time t14, a period from time t2 to time t24, and a period from time t3 to time t34, and the drive power may constantly be the third power W3 in a period from time t14 to time t2, a period from time t24 to time t3, and a period from time t34 to time t4.

Note that, in the example shown in FIGS. 17A and 17B, the time t14 is the time dividing the period from the time t1 to the time t2 in halves, the time t24 is the time dividing the period from the time t2 to the time t3 in halves, and the time t34 is the time dividing the period from the time t3 to the time t4 in halves.

By supplying the drive power to the discharge lamps 90-1 and 90-2 in the manner as shown in FIGS. 17A and 17B, in the second mode period, the total value of the drive power supplied to the discharge lamps 90-1 and 90-2 is a constant value of (W2+W3). That is, the change width of the total value of the drive power supplied to the discharge lamps 90-1 and 90-2 is zero.

In the example shown in FIG. 16A and 16B and the example shown in FIG. 17A and 17B, similarly, the second mode with the lower power is provided, and thus, power consumption may be suppressed. In the example shown in FIG. 16A and 16B and the example shown in FIG. 17A and 17B, similarly, in the second mode with the lower power, the discharge lamp drive units 230-1 and 230-2 are controlled to supply the drive power to the discharge lamps 90-1 and 90-2 while changing it, and thus, the states with the lower electrode temperatures of the discharge lamps 90-1 and 90-2 are not maintained in a long time. Thereby, occurrence of the blackening phenomenon of the discharge lamps 90-1 and 90-2 may be suppressed. Therefore, the projector in which deterioration of the discharge lamp may be suppressed with suppressed power consumption may be realized.

In addition, since the change width of the total value of the drive power supplied to the respective discharge lamps 90-1 and 90-2 maybe less than 2×(W2−W3) as the value twice the difference between the second power W2 and the third power W3, and thus, the change of the illuminance of the projector due to the change of the drive power is smaller compared to the case where there is one discharge lamp. Therefore, the projector that hardly brings a feeling of discomfort to a user may be realized.

In the second embodiment, the projector having the two light sources containing discharge lamps have been exemplified for explanation, however, the invention is not limited to that, but may be applied to a projector having three or more light sources containing discharge lamps.

In the above described respective embodiments, the projector using the three liquid crystal panels has been exemplified for explanation, however, the invention is not limited to that, but maybe applied to a projector having one, two, four, or more liquid crystal panels.

In the above described respective embodiments, the transmissive-type projector has been exemplified for explanation, however, the invention is not limited to that, but may be applied to a reflective-type projector. Here, "transmissive-type" refers to a type in which an electrooptic modulation device as light modulating means transmits light like a transmissive liquid crystal panel or the like, and "reflective-type" refers to a type in which an electrooptic modulation device as light modulating means reflects light like a reflective liquid crystal panel, a micromirror light modulation device, or the like. As the micromirror light modulation device, for example, a DMD (digital micromirror device; Trademark of Texas Instruments) may be used. In the case where the invention is applied to the reflective-type projector, the same advantages as those of the transmissive-type projector may be obtained.

The invention may be applied to both a front-projection projector that projects a projection image from an observation side and a rear-projection projector that projects a projection image from an opposite side to the observation side.

Note that the invention is not limited to the above described embodiments, but various modifications may be implemented within the scope of the invention.

The invention includes substantially the same configuration as the configurations that have been explained in the embodiments (the configurations having the same functions, methods, and results or the configurations having the same purposes and advantages). Further, the invention includes configurations in which the non-essential parts of the configurations that have been explained in the embodiments are replaced. Furthermore, the invention includes configurations that may exert the same operations and effects or achieve the same purposes as those of the configurations that have been explained in the embodiments. In addition, the invention includes configurations formed by adding known technologies to the configurations that have been explained in the embodiments.

In the above description, the embodiments of the invention have been explained in detail, and a person who skilled in the art could easily understand that many modifications may be made without substantively departing from the new matter and effects of the invention. Therefore, all of these modified examples may be included within the range of the invention.

What is claimed is:

1. A projector comprising:
  a discharge lamp;
  a discharge lamp drive unit that drives the discharge lamp by supplying drive power to the discharge lamp; and
  a control unit that has a first mode and a second mode as operation modes and controls the discharge lamp drive unit according to the operation modes,
  wherein the control unit controls the discharge lamp drive unit to supply first power as the drive power to the discharge lamp when the operation mode is the first mode, and controls the discharge lamp drive unit to supply the drive power to the discharge lamp while periodically varying the drive power between a second power and a third power when the operation mode is the second mode, the second power being less than the first power and the third power being less than the second power,
  wherein the discharge lamp drive unit supplies the drive power to the discharge lamp by supplying an alternating current as a drive current to the discharge lamp, and
  the control unit controls the discharge lamp drive unit to supply the drive power to the discharge lamp while changing the drive power to change an average value of the drive power per cycle of the drive current when the o eration mode is the second mode.

2. The projector according to claim 1, wherein the third power is power with which the discharge lamp may maintain a lighting state.

3. The projector according to claim 1, wherein the control unit varies the drive power in the second mode to form a periodic pattern.

4. The projector according to claim 1, wherein the control unit varies the drive power in the second mode to form a periodic pattern of sinusoidal curves.

5. The projector according to claim 1, wherein the control unit varies the drive power in the second mode to form a periodic pattern of rectangular waves.

6. The projector according to claim 1, wherein the control unit varies the drive power in the second mode to form a periodic pattern that linearly and monotonically increases to the second power and linearly and monotonically decreases to the third power.

7. The projector according to claim 1, wherein the control unit varies the drive power in the second mode to form a periodic pattern that changes in a stepwise manner.

8. The projector according to claim 1, wherein the control unit varies the drive power in the second mode to form a periodic pattern such that the length of a period in which the drive power is higher than an average value of the drive power in the second mode is different than a length of the period in which the drive power is lower than the average value of the drive power in the second mode.

9. The projector according to claim 1, wherein the control unit varies the drive power in the second mode to form a periodic pattern whose period is from ten seconds to one minute.

10. The projector according to claim 1, wherein the control unit varies the drive power in the second mode to form a continuous and periodic pattern.

11. A projector comprising:
plural light sources; and
a control unit that has a first mode and a second mode as operation modes and controls the light sources according to the operation modes,
each of the light sources including a discharge lamp and a discharge lamp drive unit that drives the discharge lamp by supplying drive power to the discharge lamp,
wherein the control unit controls the respective discharge lamp drive units to supply first power as the drive power to the respective discharge lamps when the operation mode is the first mode, and controls the respective discharge lamp drive units to supply the drive power to the respective discharge lamps while periodically varying the drive power between a second power and a third power when the operation mode is the second mode, the second power being less than the first power and the third power being less than the second power, the drive power being varied such that change widths of total values of the drive power supplied to the respective discharge lamps may be less than twice a difference between the second power and the third power when the operation mode is the second mode,
wherein the respective discharge lamp drive units supply the drive power to the discharge lamps by supplying alternating currents as drive currents to the discharge lamps, and the control unit controls the discharge lamp drive units to supply the drive power to the respective discharge lamps while changing the drive power to change average values of the drive power per cycle of the drive currents when the operation mode is the second mode.

12. The projector according to claim 11, wherein the third power is power with which the respective discharge lamps may maintain lighting states.

13. The projector according to claim 11, wherein the control unit varies the drive power in the second mode to form a periodic pattern.

14. The projector according to claim 11, wherein the control unit varies the drive power in the second mode to form a periodic pattern of sinusoidal curves.

15. The projector according to claim 1, wherein the control unit varies the drive power in the second mode to form a periodic pattern of rectangular waves.

16. The projector according to claim 11, wherein the control unit varies the drive power in the second mode to form a periodic pattern that linearly and monotonically increases to the second power and linearly and monotonically decreases to the third power.

17. The projector according to claim 11, wherein the control unit varies the drive power in the second mode to form a periodic pattern that changes in a stepwise manner.

18. The projector according to claim 11, wherein the control unit varies the drive power in the second mode to form a periodic pattern such that the length of a period in which the drive power is higher than an average value of the drive power in the second mode is different than a length of the period in which the drive power is lower than the average value of the drive power in the second mode.

19. The projector according to claim 11, wherein the control unit varies the drive power in the second mode to form a periodic pattern whose period is from ten seconds to one minute.

20. The projector according to claim 11, wherein the control unit varies the drive power in the second mode to form a continuous and periodic pattern.

* * * * *